US012589054B2

(12) United States Patent
Douglas et al.

(10) Patent No.: US 12,589,054 B2
(45) Date of Patent: Mar. 31, 2026

(54) TEETHING MITT

(71) Applicant: Quintessential Tots, LLC, Naperville, IL (US)

(72) Inventors: Kelly Douglas, Naperville, IL (US); Maureen Salazar, Naperville, IL (US)

(73) Assignee: QUINTESSENTIAL TOTS, LLC, Naperville, IL (US)

( * ) Notice: Subject to any disclaimer, the term of this patent is extended or adjusted under 35 U.S.C. 154(b) by 56 days.

(21) Appl. No.: 18/666,263

(22) Filed: May 16, 2024

(65) Prior Publication Data

US 2024/0382386 A1 Nov. 21, 2024

Related U.S. Application Data

(60) Provisional application No. 63/502,576, filed on May 16, 2023.

(51) Int. Cl.

| | |
|---|---|
| ***A61J 17/00*** | (2006.01) |
| ***A41D 19/00*** | (2006.01) |
| ***A41F 1/06*** | (2006.01) |

(52) U.S. Cl.

CPC ....... *A61J 17/1011* (2020.05); *A41D 19/0024* (2013.01); *A41D 19/0048* (2013.01); *A41D 19/0058* (2013.01); *A41F 1/06* (2013.01)

(58) Field of Classification Search

CPC ... A61J 17/1011; A61J 17/02; A41D 19/0024; A41D 19/0048; A41D 19/0058; A41D 19/01; A41F 1/06

See application file for complete search history.

(56) References Cited

U.S. PATENT DOCUMENTS

| | | | |
|---|---|---|---|
| 1,940,728 | A | 12/1933 | O'Connor |
| D242,055 | S | 10/1976 | Brown |
| 4,754,963 | A | 7/1988 | Dowd |
| D921,118 | S | 6/2021 | Yu |
| D924,980 | S | 7/2021 | Yu |
| 11,083,234 | B2 | 8/2021 | Hyslop |
| D941,398 | S | 1/2022 | Zhang |
| D950,649 | S | 5/2022 | Deng |
| D968,080 | S | 11/2022 | Lin |
| D969,228 | S | 11/2022 | Chen |
| D969,229 | S | 11/2022 | Chen |
| D969,230 | S | 11/2022 | Dai |
| D970,636 | S | 11/2022 | Yang |
| D970,637 | S | 11/2022 | Yang |
| D970,638 | S | 11/2022 | Yang |
| D970,639 | S | 11/2022 | Yu |
| D970,640 | S | 11/2022 | Yang |
| D970,641 | S | 11/2022 | Luo |
| D970,642 | S | 11/2022 | Luo |
| D970,643 | S | 11/2022 | Shi |

(Continued)

*Primary Examiner* — Andrew Restaino

(74) *Attorney, Agent, or Firm* — Greenberg Traurig, LLP

(57) ABSTRACT

A teething mitt includes a teething portion having at least one raised element disposed on an outer surface, the at least one raised element configured to transition from a first position to a second position in response to external pressure; and a glove portion that has a first end configured to couple with the teething portion; and a second end configured to receive a hand of a user, the second portion having an adjustable strap affixed to an exterior of the bottom end and configured to secure the glove portion to the user.

16 Claims, 31 Drawing Sheets

(56) References Cited

U.S. PATENT DOCUMENTS

| | | | | |
|---|---|---|---|---|
| D970,644 | S | 11/2022 | Shi | |
| D970,645 | S | 11/2022 | Shi | |
| D974,488 | S | 1/2023 | Yin | |
| D977,584 | S | 2/2023 | Dai | |
| 11,641,896 | B2 * | 5/2023 | Ripley | A41D 19/0024 2/160 |
| 2005/0004603 | A1 * | 1/2005 | Desousa | A61J 17/02 606/235 |
| 2005/0222621 | A1 * | 10/2005 | Duwelius | A41D 19/01594 606/235 |
| 2006/0004412 | A1 * | 1/2006 | Gilbert | A61J 17/02 606/234 |
| 2009/0143822 | A1 * | 6/2009 | Perry | A61J 17/02 606/235 |
| 2011/0281688 | A1 | 11/2011 | Harris, Jr. | |
| 2015/0209240 | A1 * | 7/2015 | Steward | A61J 17/02 606/235 |
| 2018/0055741 | A1 * | 3/2018 | Hyslop | A41D 19/0024 |
| 2018/0263858 | A1 | 9/2018 | Williams | |
| 2020/0352828 | A1 * | 11/2020 | Romig | A61J 17/1111 |
| 2021/0030088 | A1 * | 2/2021 | Hyslop | A41D 19/01 |

* cited by examiner

TEETHING MITT

CROSS-REFERENCE TO RELATED APPLICATION

This application claims the benefit of U.S. Patent Application No. 63/502,576, filed May 16, 2023, the contents of which are incorporated herein in their entirety and for all purposes.

TECHNICAL FIELD

The present description relates generally to a teething mitt.

DETAILED DESCRIPTION

The following description of example methods and apparatus is not intended to limit the scope of the description to the precise form or forms detailed herein. Instead, the following description is intended to be illustrative so that others may follow its teachings.

With reference to the figures, a teething mitt 10 is now disclosed. It is to be appreciated, however, that this example form for the teething mitt is not intended to be limiting.

Figure 1:
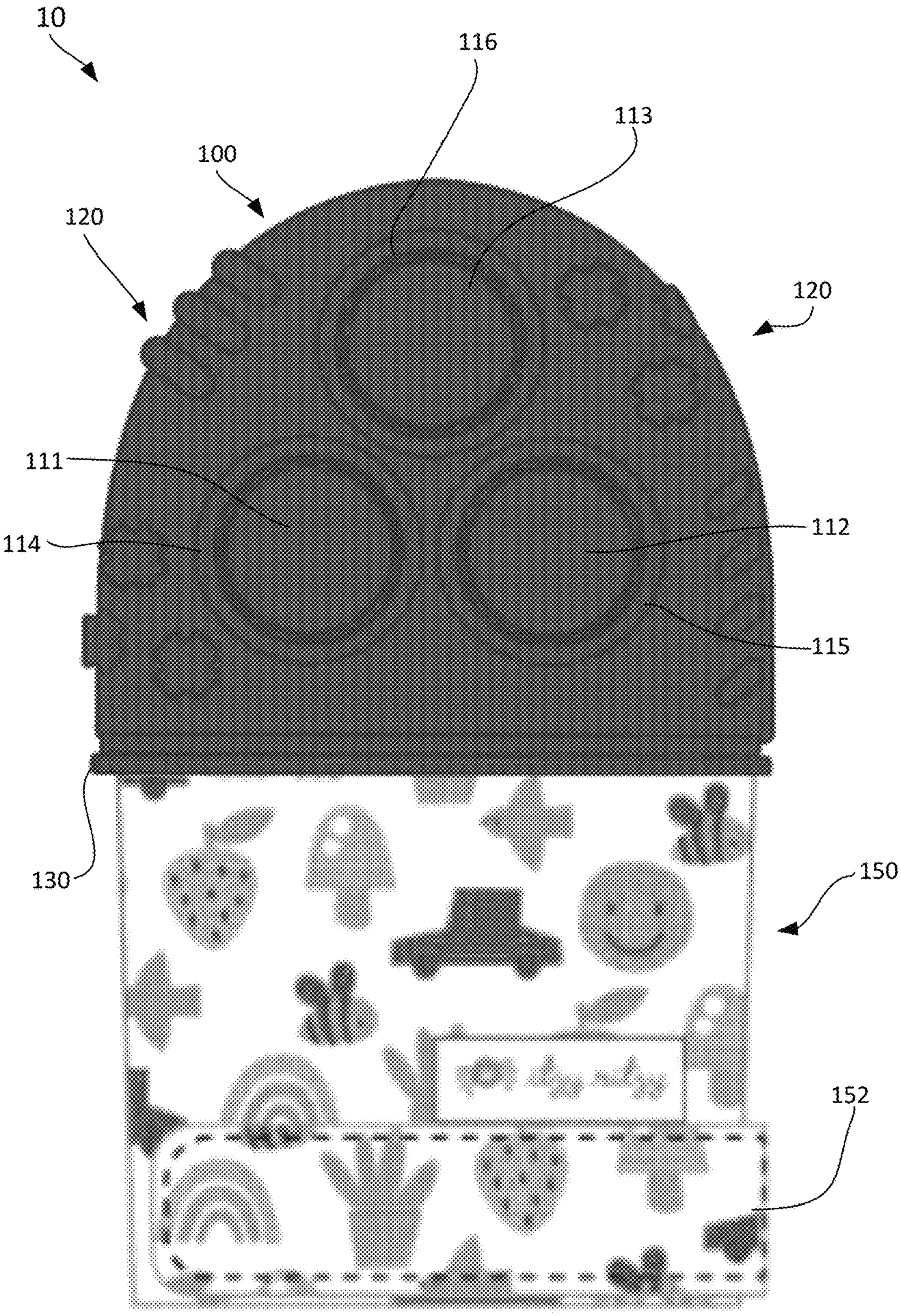
FIG. 1 is a front view of a teething mitt.
Figure 2:
FIG. 2 is a example use case of the teething mitt of FIG. 1.

The example teething mitt 10 illustrated in FIG. 1 includes a teething portion 100 and a glove portion 150. The teething portion includes a first raised element 111, a second raised element 112, and a third raised element 113. Each raised element 111-113 may be a resilient member configured to flex (or toggle) between a substantially convex position and a substantially concave position in response to external pressure, relative to an exterior of the teething mitt 10. In the example shown, each raised element 111-113 is in the substantially convex position.

Each raised element 111-113 may be a "popper" such that when pressure is applied to the each raised element 111-113, the each raised element 111-113 flexes from a convex to concave shape. When pressure is released (or when pressure is applied from an opposite direction, like the from interior 140 of the teething portion 100), the raised element 111-113 may return to its original shape, and flex from a concave shape to a convex shape.

To facilitate the resiliency of each raised element 111-113, each example raised element 111-113 is encircled by a rigid ring 114, 115, and 116 respectively. Each rigid ring 114-116 may be sized and shaped to maintain the substantially convex position of the corresponding raised element 111-113. As such, when the raised element 111-113 receives pressure, the rigid ring 114-116 prevents the raised element 111-113 from spreading or otherwise expanding in an orthogonal direction relative to the received pressure, and instead directs the pressure to transitioning the raised element 111-113 into the concave position.

The teething portion 100 may be made of any suitable material, including a silicone or a similarly-resilient material, and is configured to withstand repeated compression and shearing forces from babies' teeth. In some examples, the teething portion 100 may be made entirely of silicone, or only a portion of the teething portion 100 may be made of silicone. The raised elements 111-113 may be made of a thinner amount (e.g., relative to the rest of the teething portion 100) of silicone to facilitate the transition from convex position to concave position.

Figure 3:
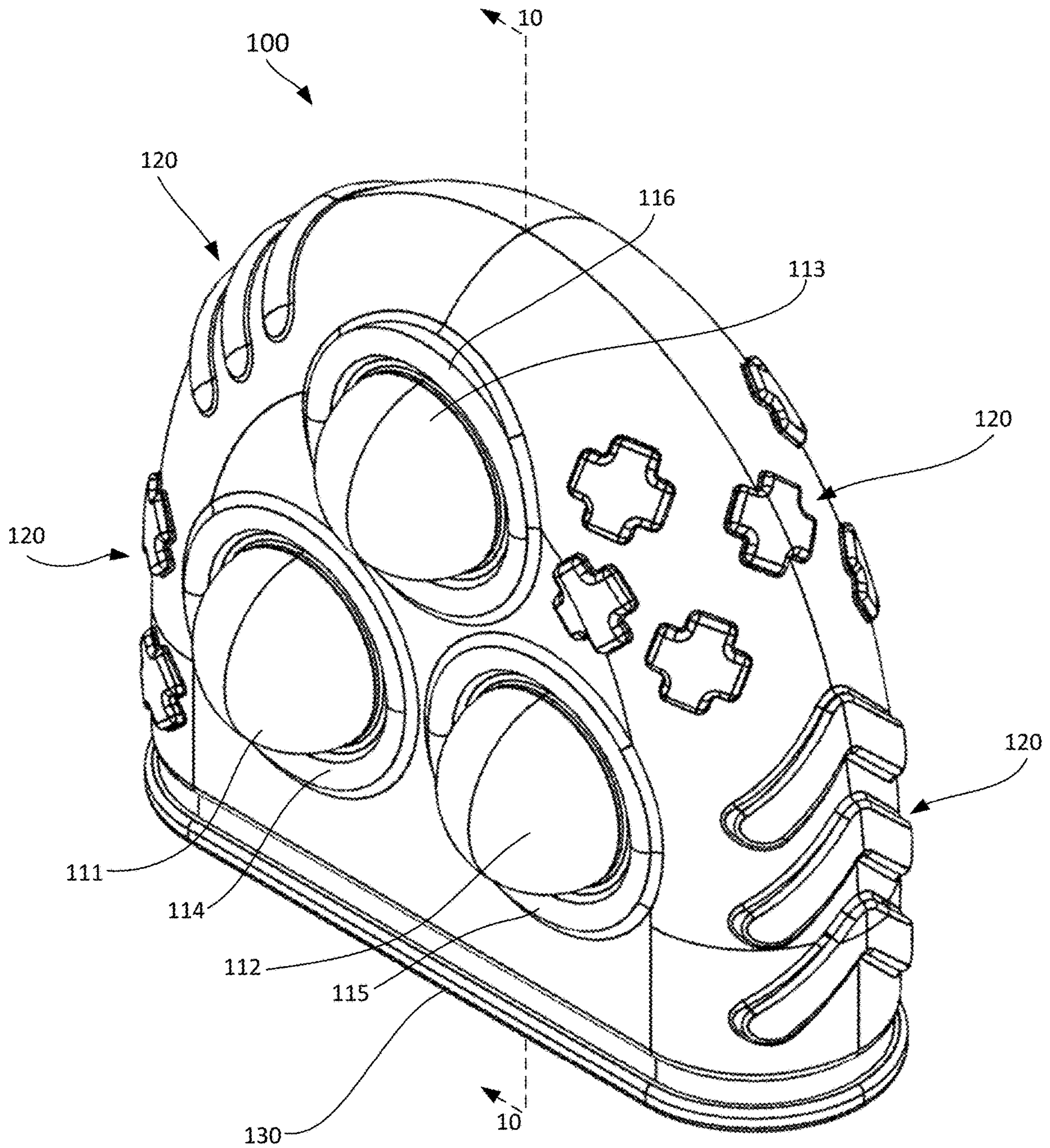
FIG. 3 is a perspective view of a teething portion of the teething mitt of FIG. 1.
Figure 4:
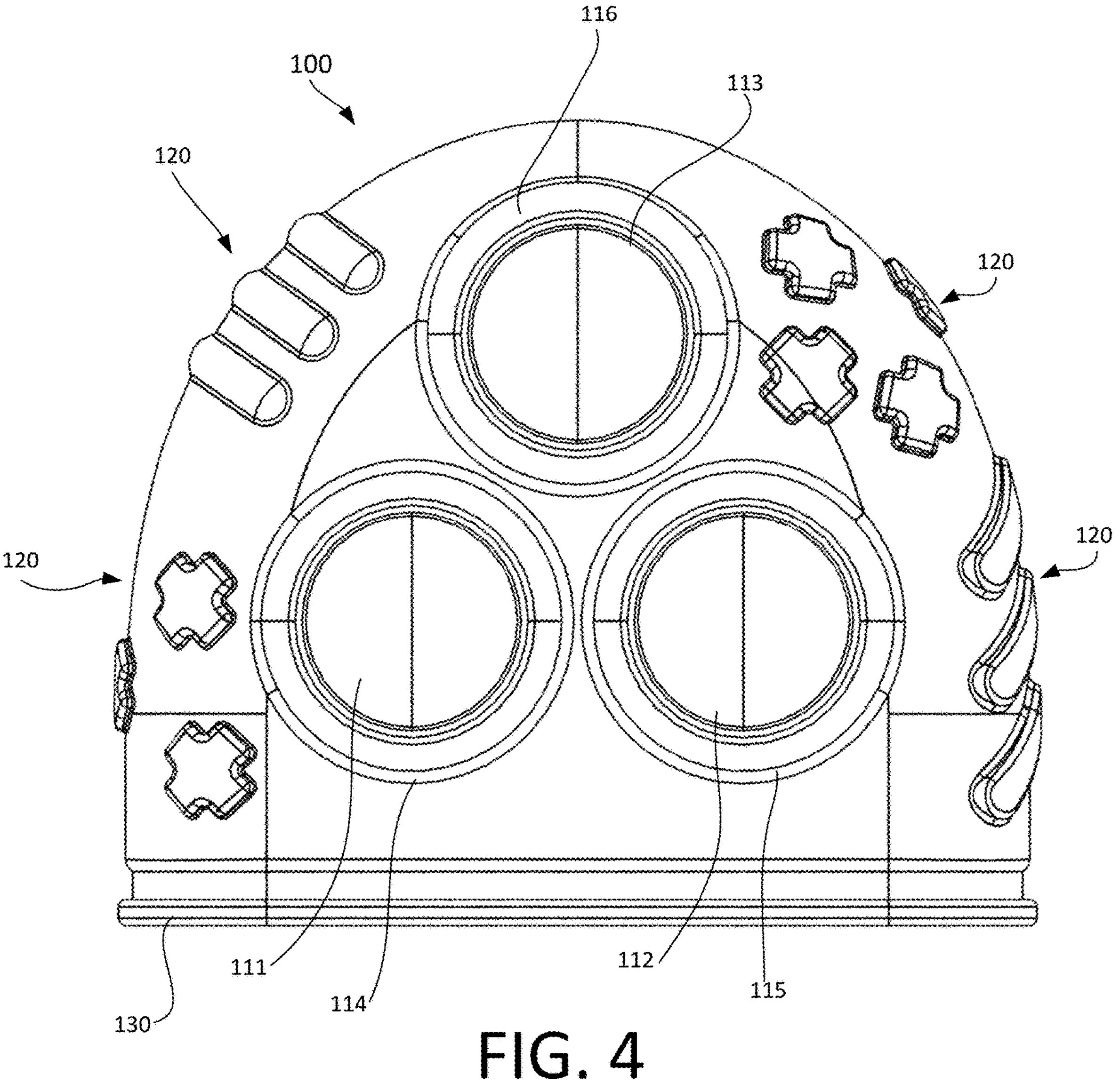
FIG. 4 is a front view of the teething portion of FIG. 3.
Figure 5:
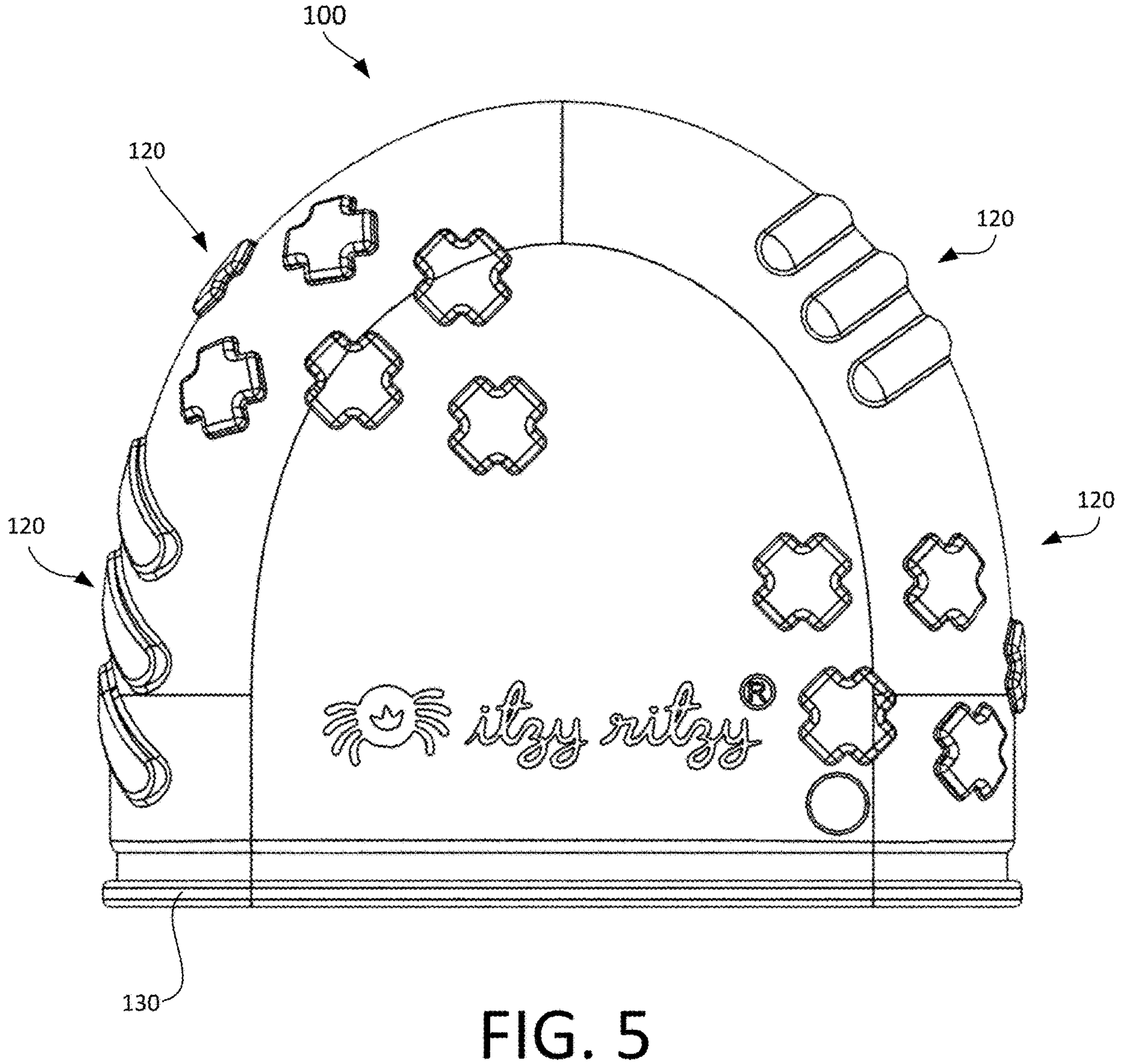
FIG. 5 is a rear view of the teething portion of FIG. 3.
Figure 6:
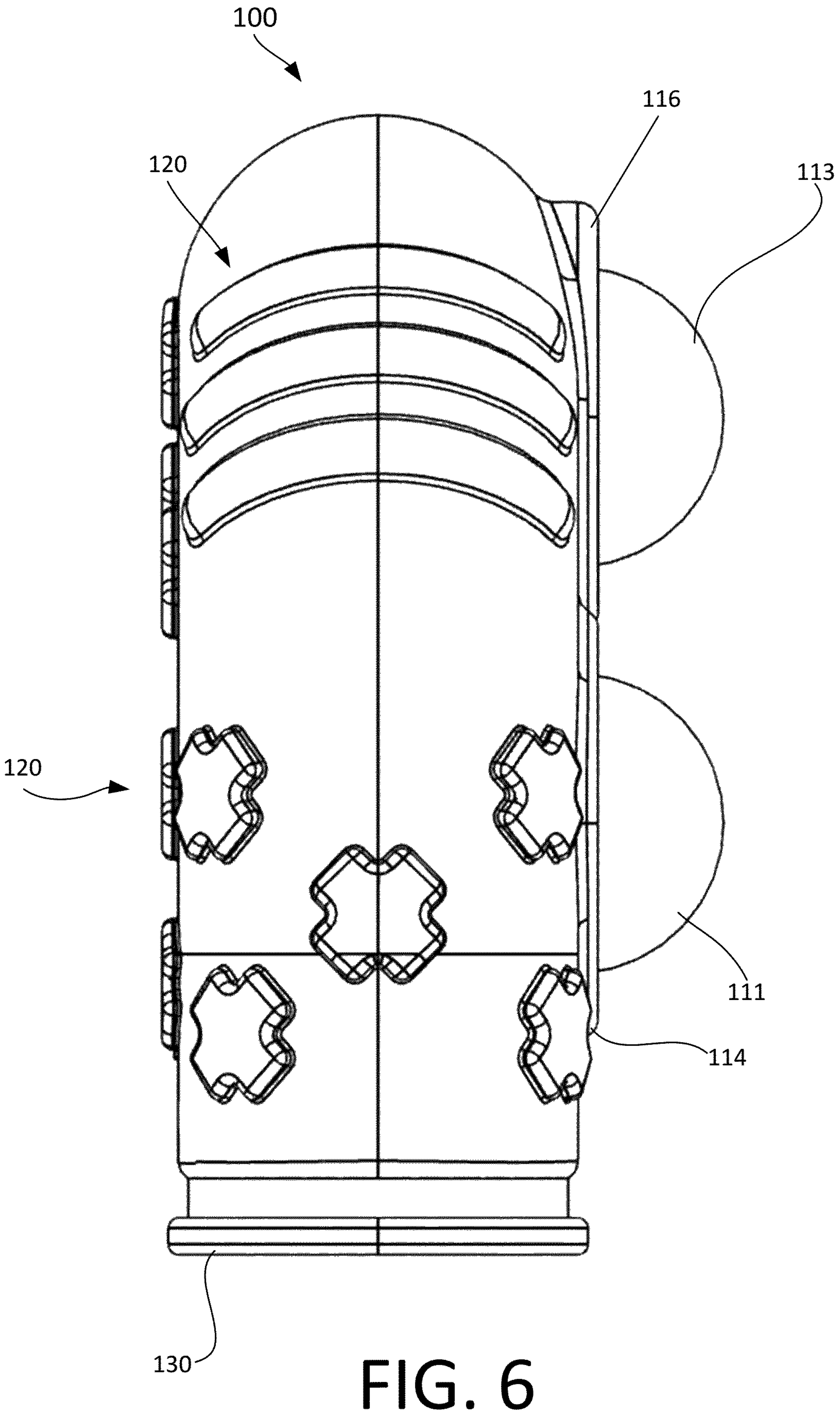
FIG. 6 is a left side view of the teething portion of FIG. 3.
Figure 7:
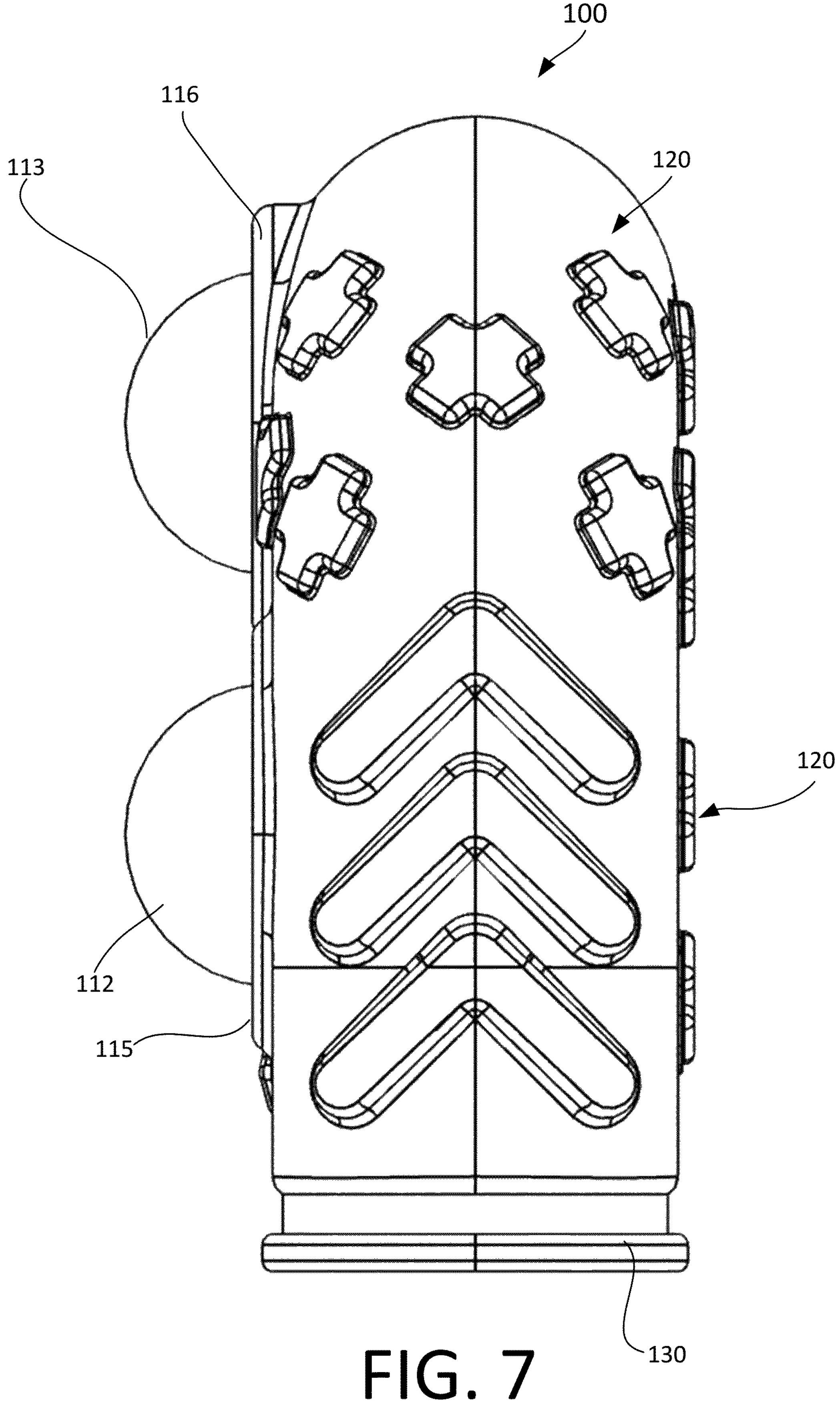
FIG. 7 is a right side view of the teething portion of FIG. 3.
Figure 8:
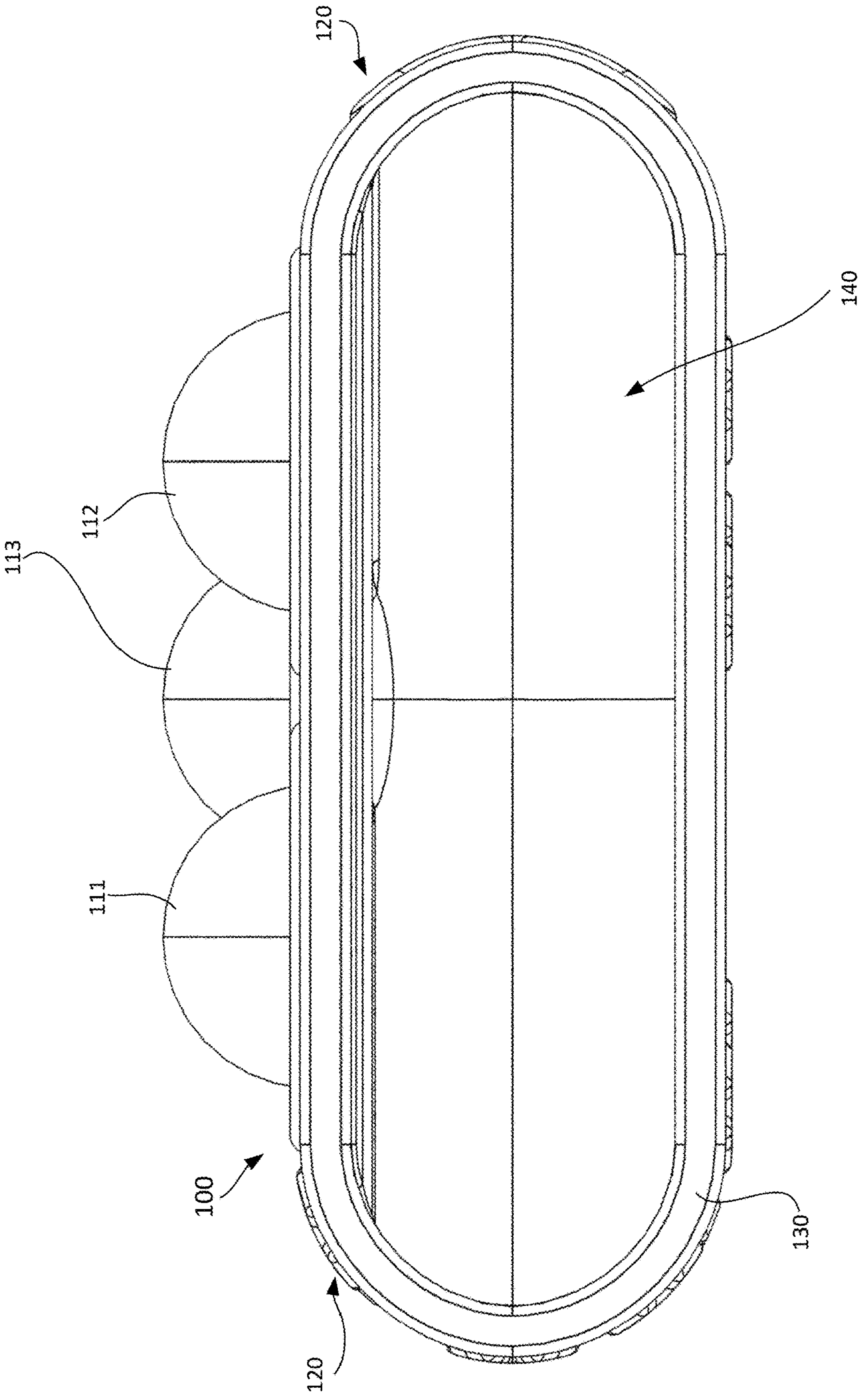
FIG. 8 is a bottom view of the teething portion of FIG. 3.
Figure 9:
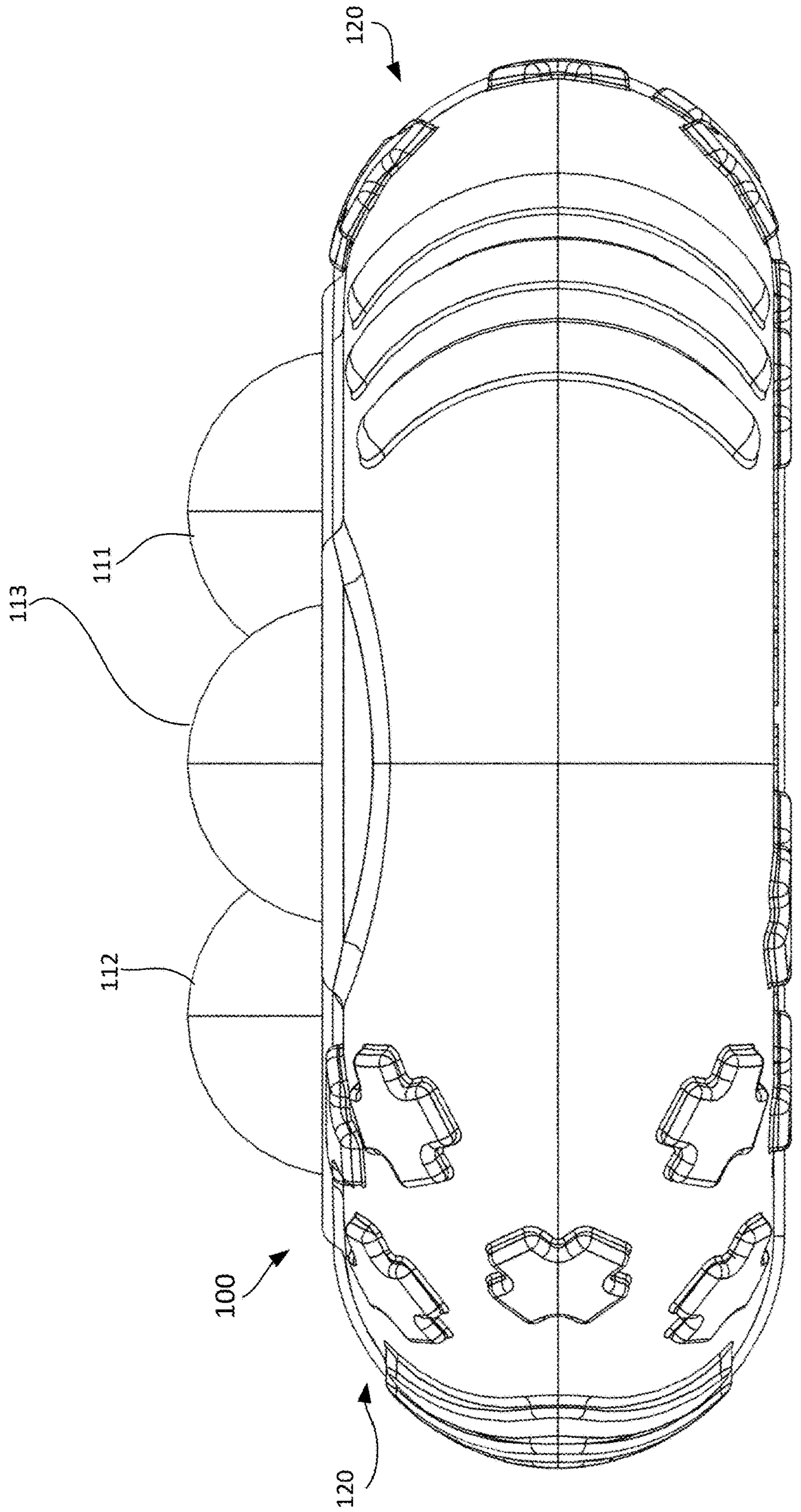
FIG. 9 is a top view of the teething portion of FIG. 3.
Figure 10:
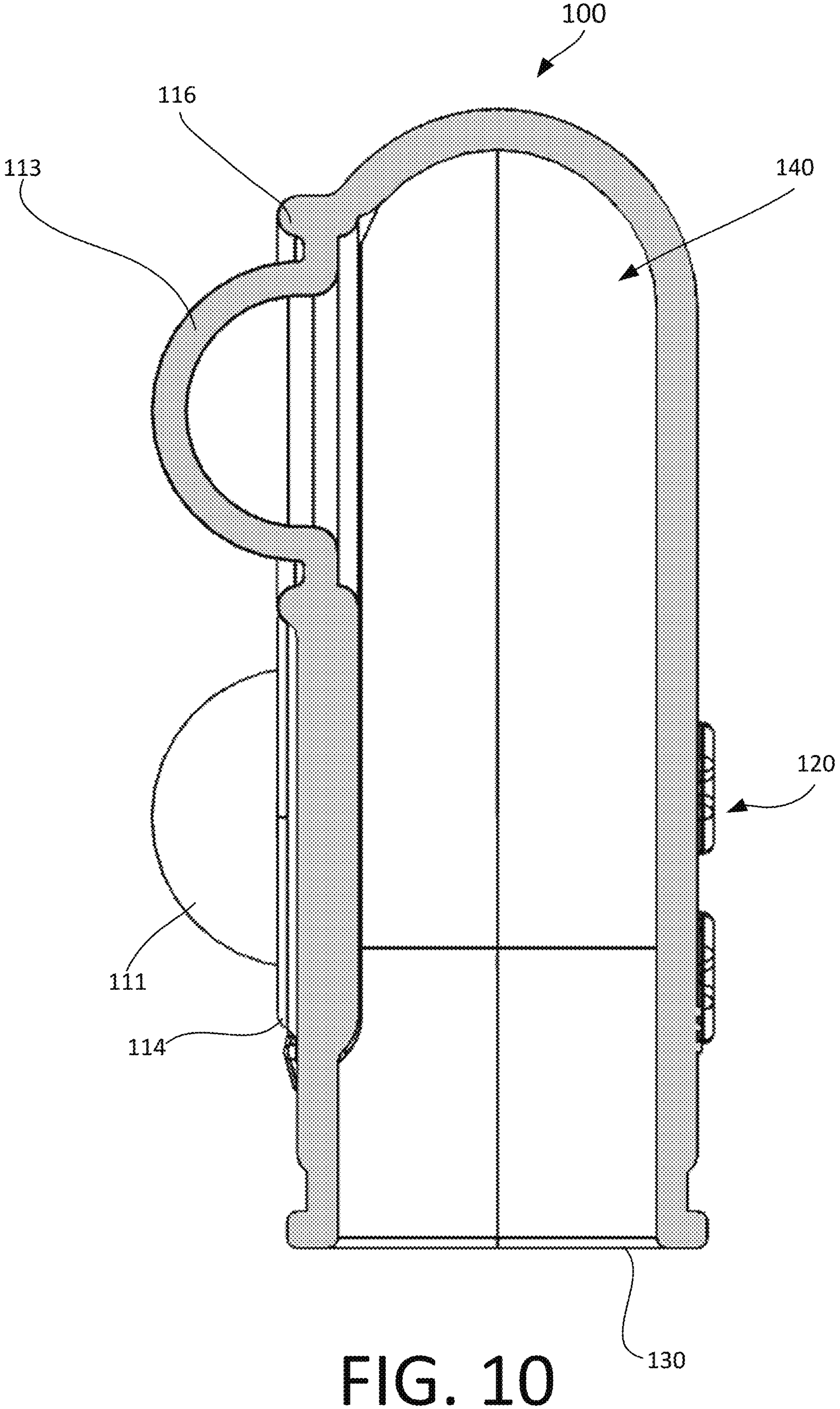
FIG. 10 is a section view of the teething portion of FIG. 3 taken along line 10-10 of FIG. 3.
Figure 11:
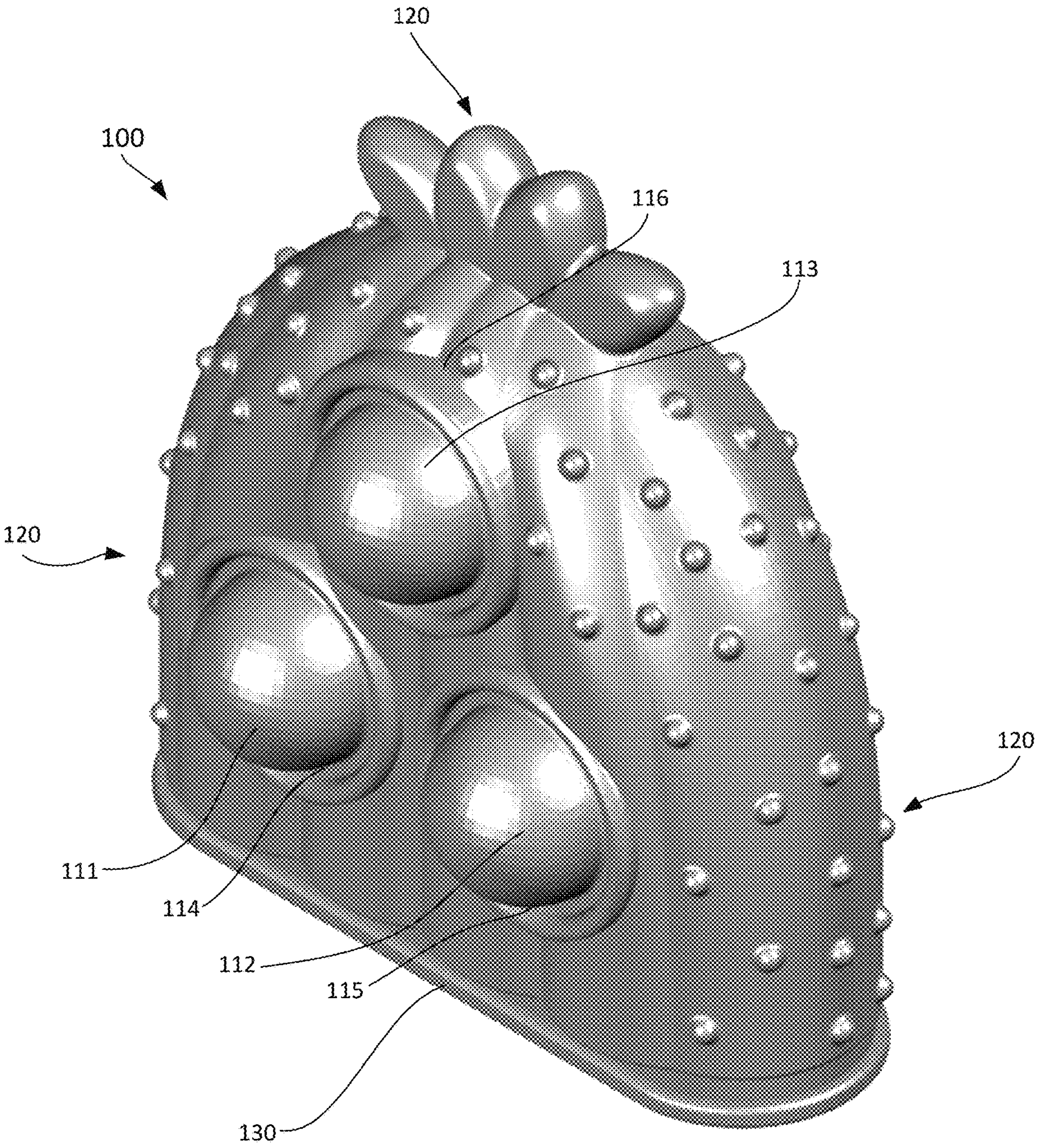
FIG. 11 is a perspective view of a teething portion of the teething mitt of FIG. 1.
Figure 12:
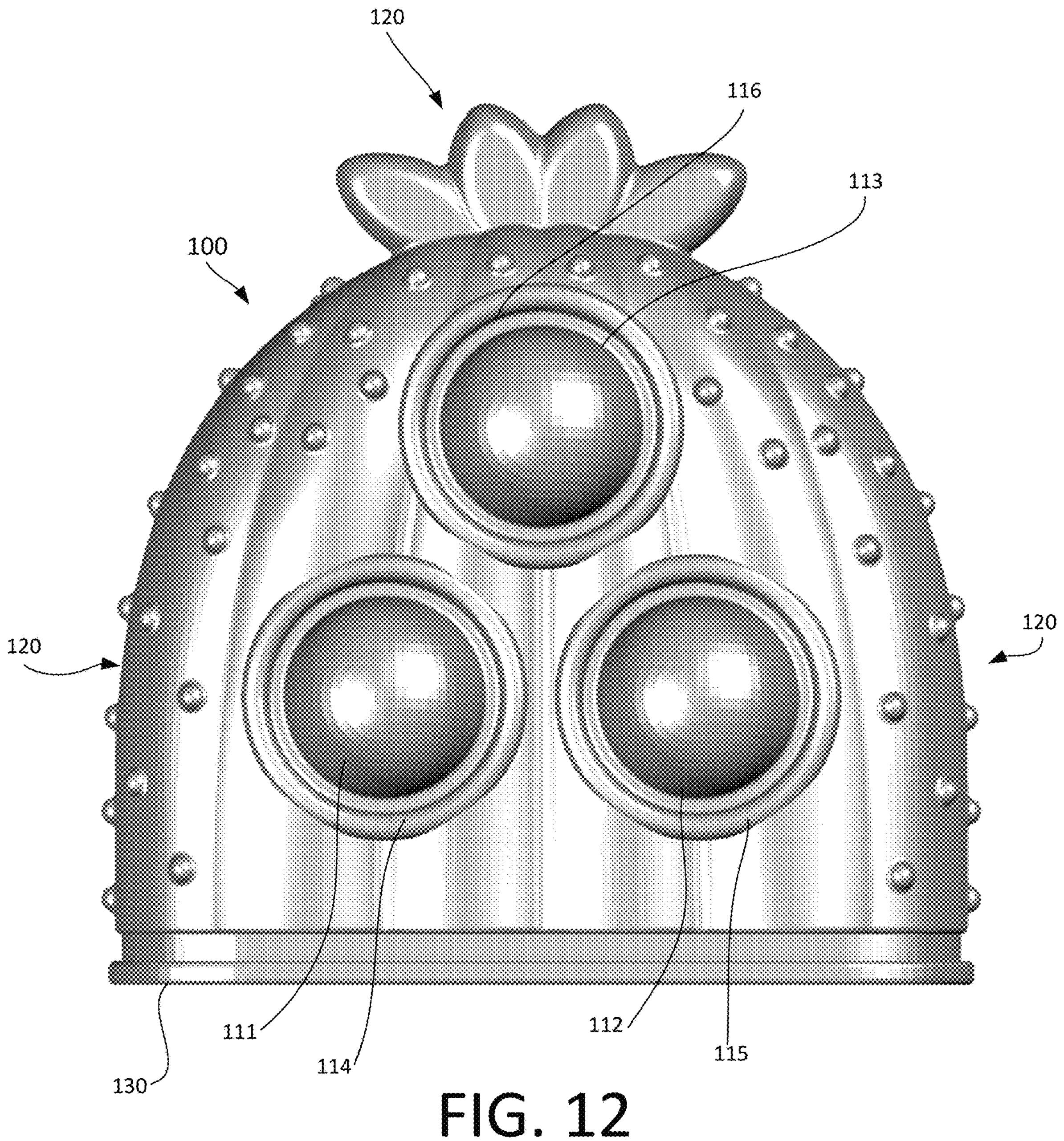
FIG. 12 is a front view of the teething portion of FIG. 11.
Figure 13:
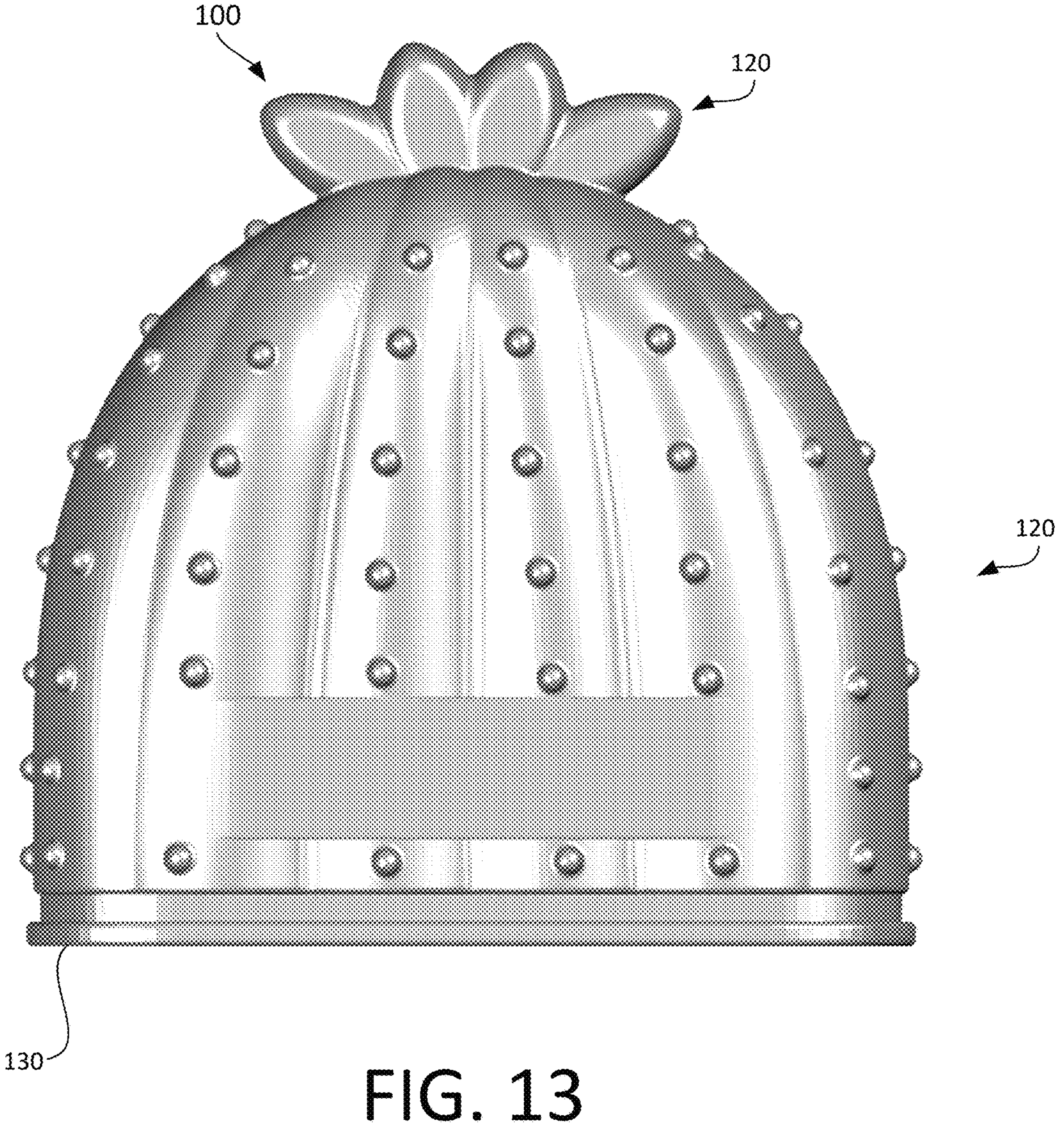
FIG. 13 is a rear view of the teething portion of FIG. 11.
Figure 14:
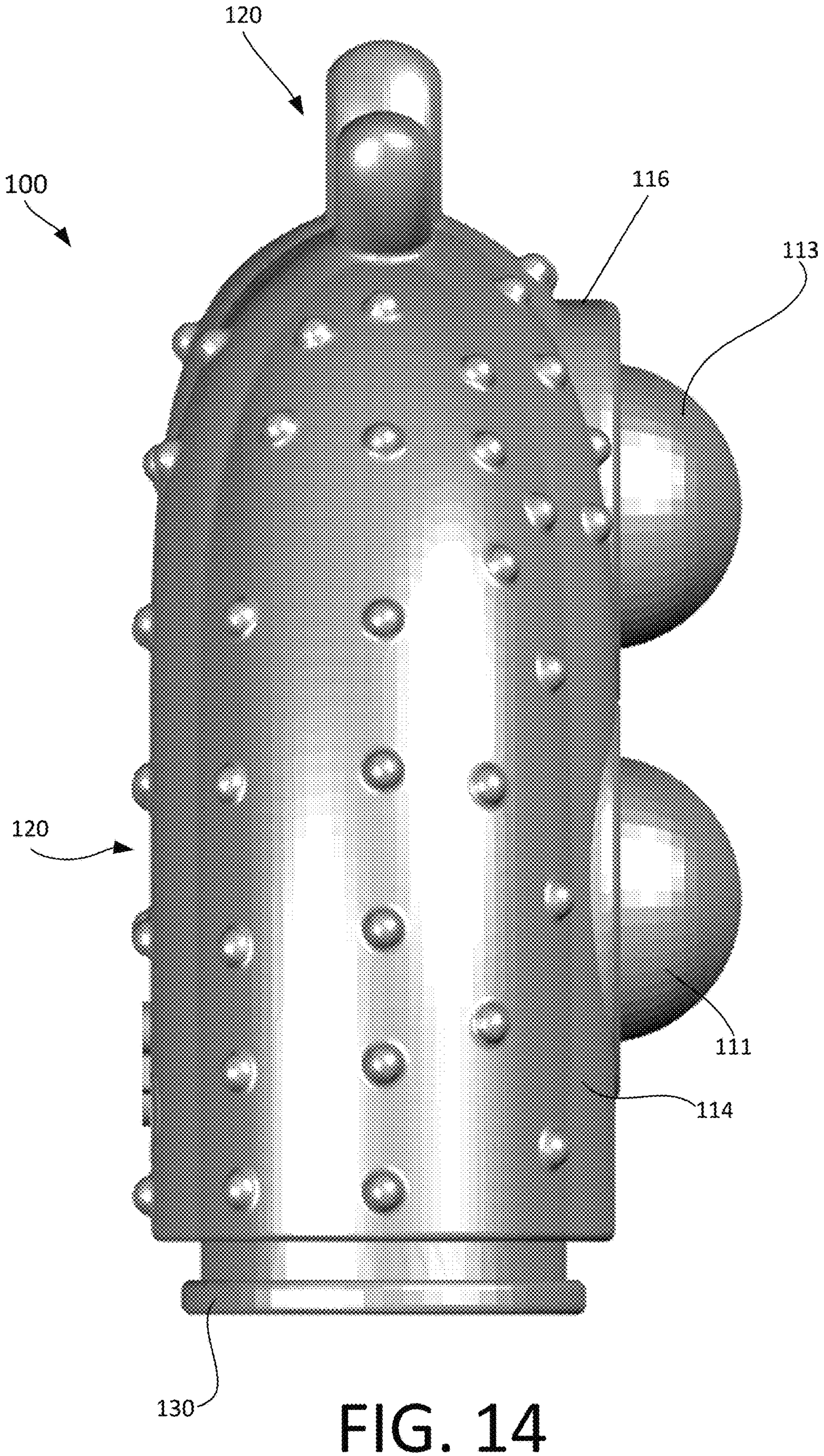
FIG. 14 is a left side view of the teething portion of FIG. 11.
Figure 15:
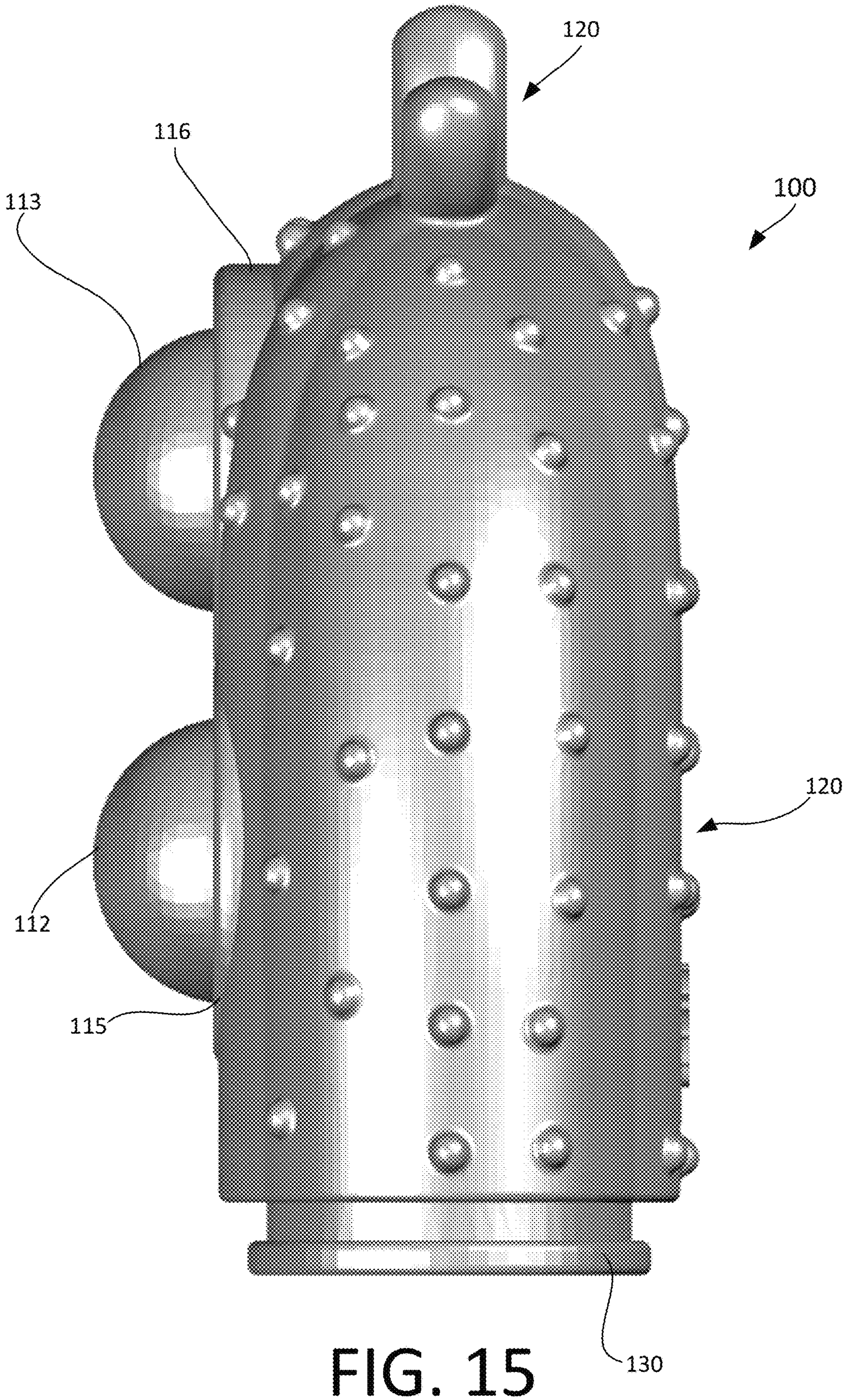
FIG. 15 is a right side view of the teething portion of FIG. 11.
Figure 16:
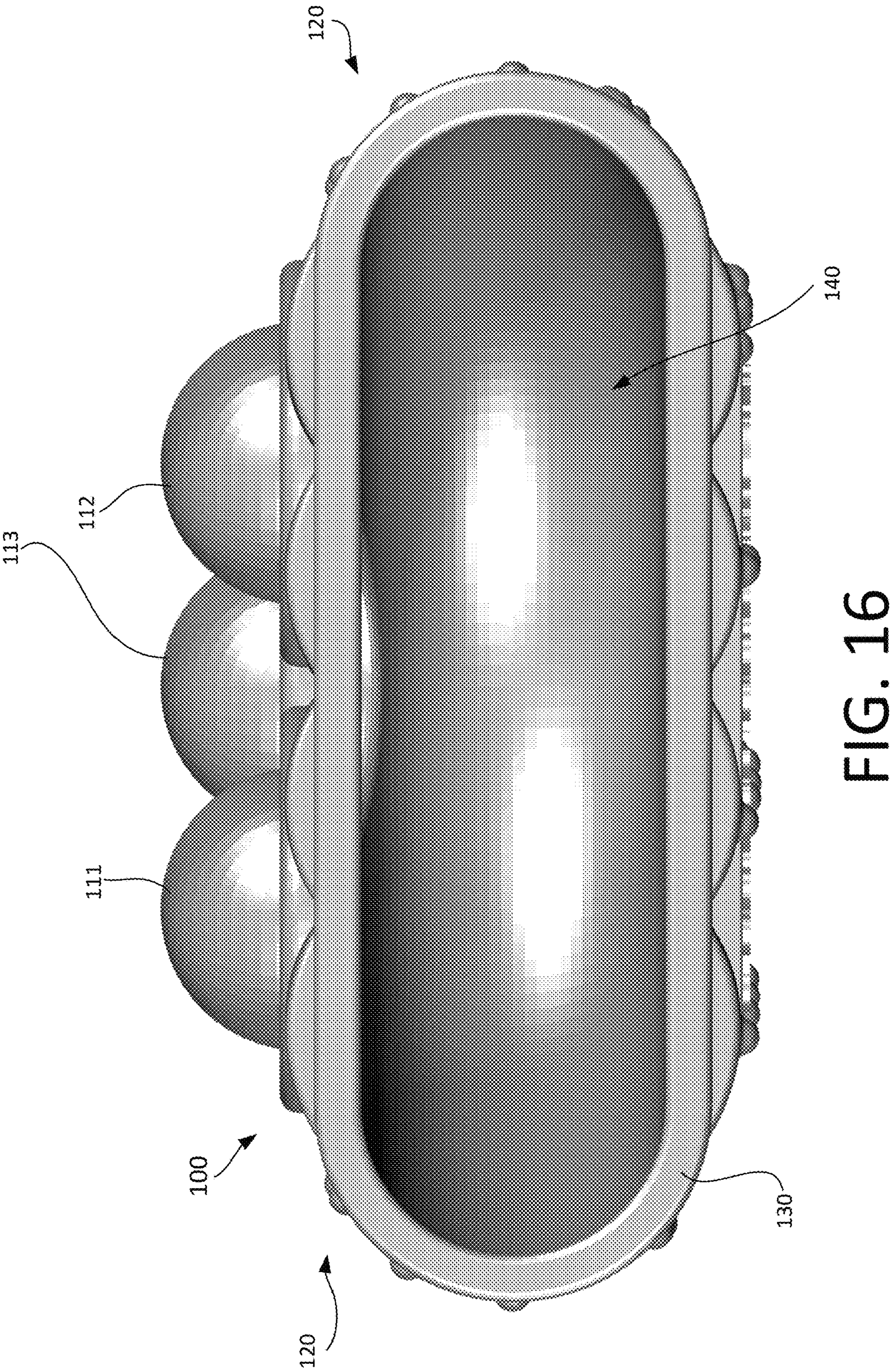
FIG. 16 is a bottom view of the teething portion of FIG. 11.
Figure 17:
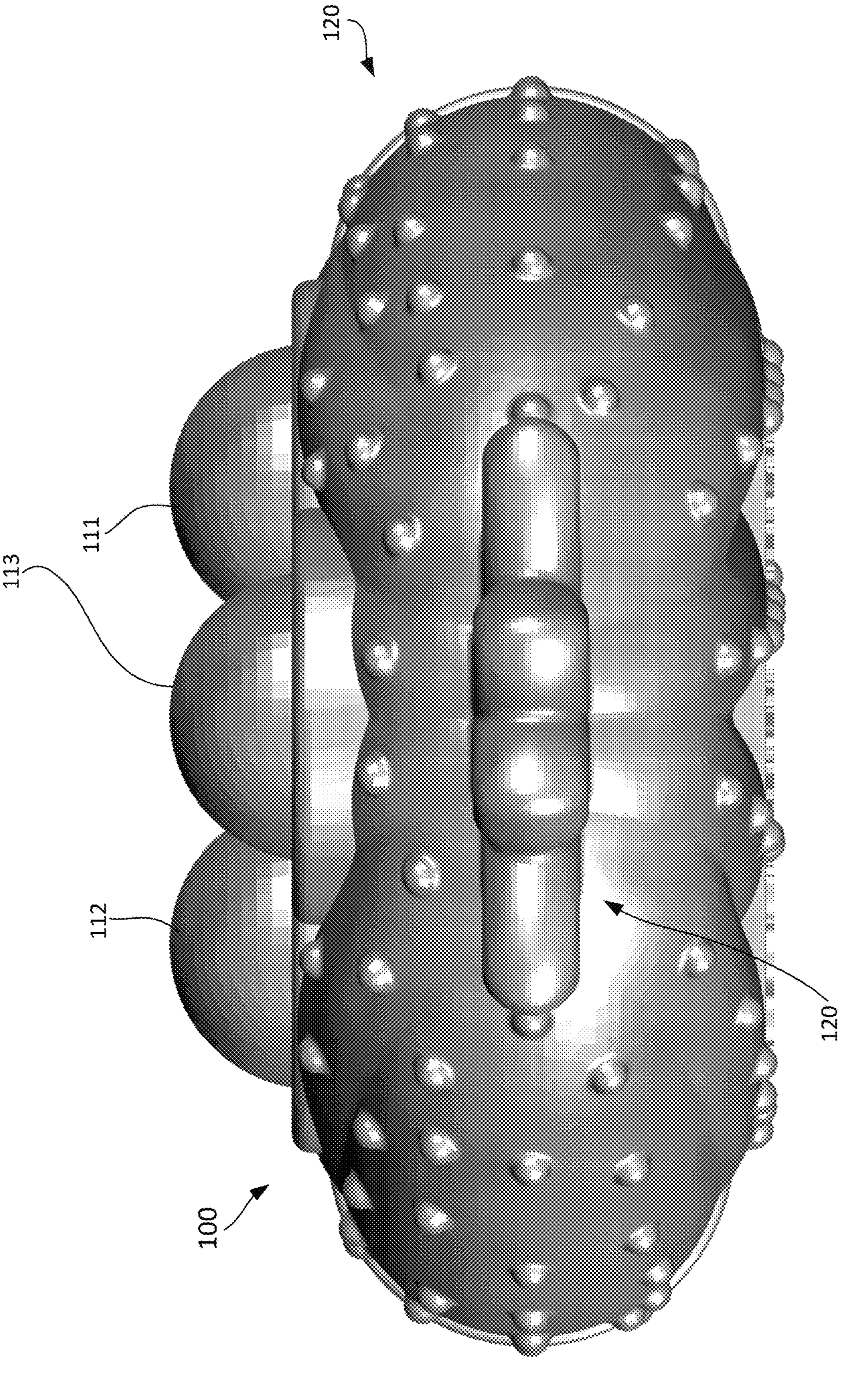
FIG. 17 is a top view of the teething portion of FIG. 11.
Figure 18:
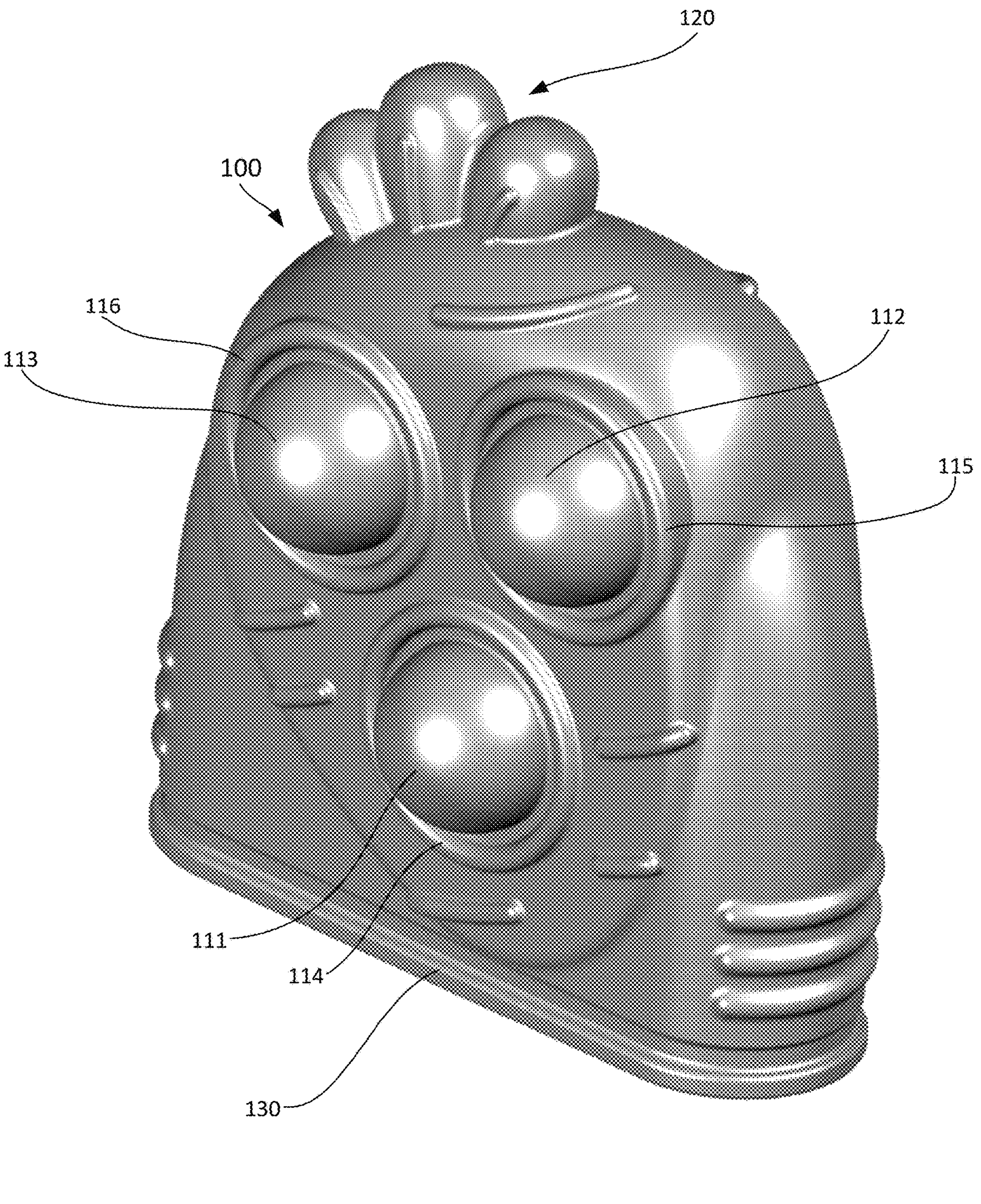
FIG. 18 is a perspective view of a teething portion of the teething mitt of FIG. 1.
Figure 19:
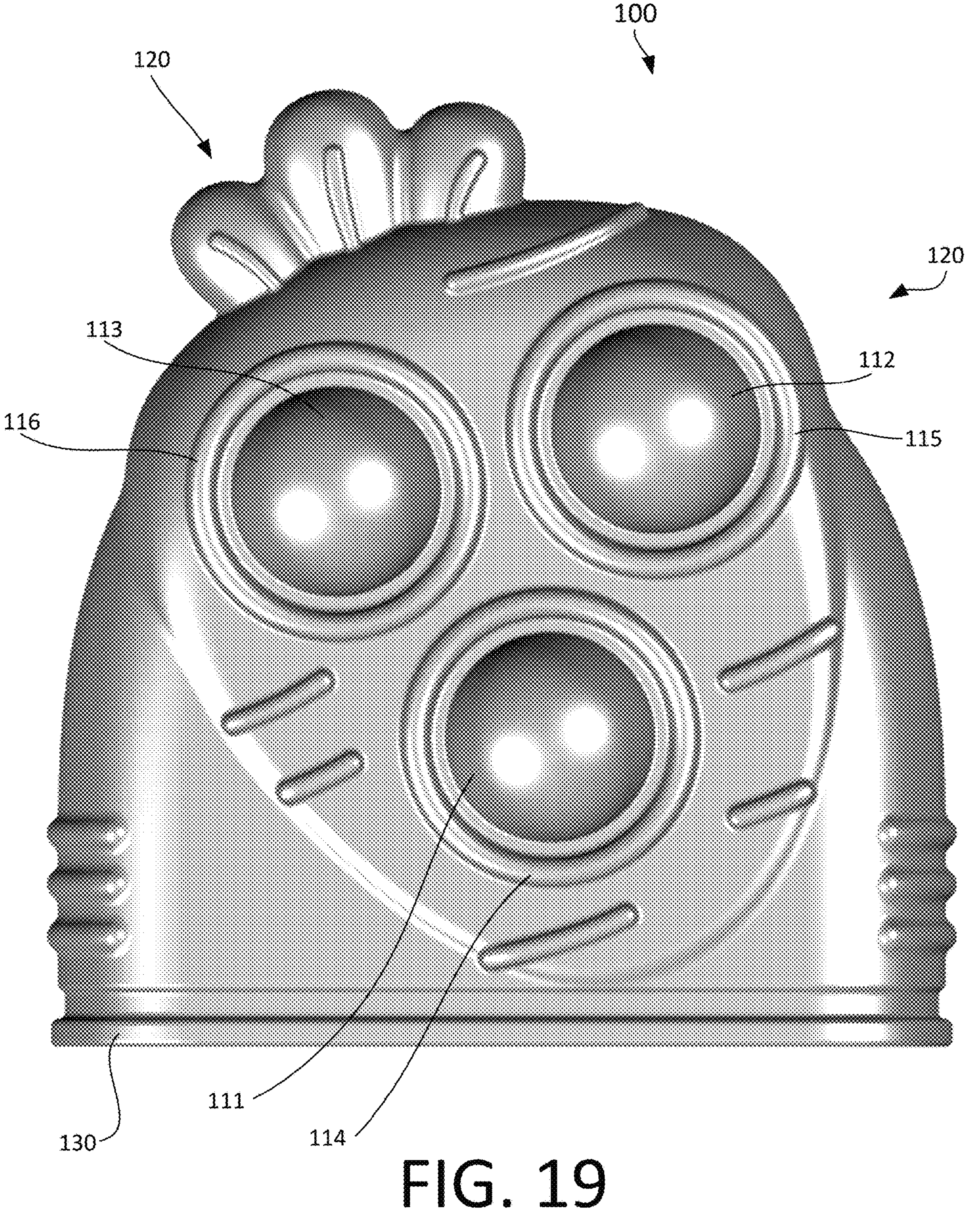
FIG. 19 is a front view of the teething portion of FIG. 18.
Figure 20:
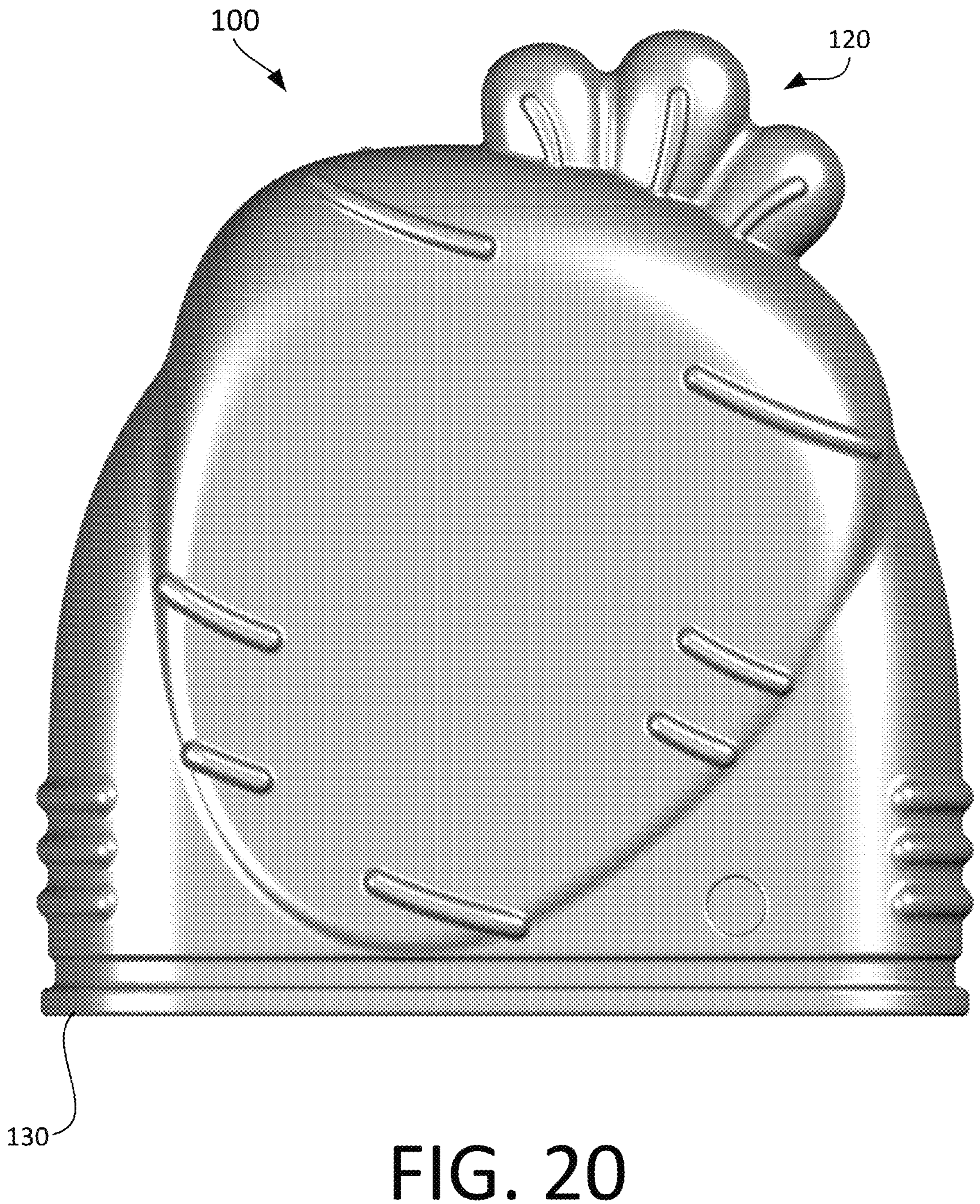
FIG. 20 is a rear view of the teething portion of FIG. 18.
Figure 21:
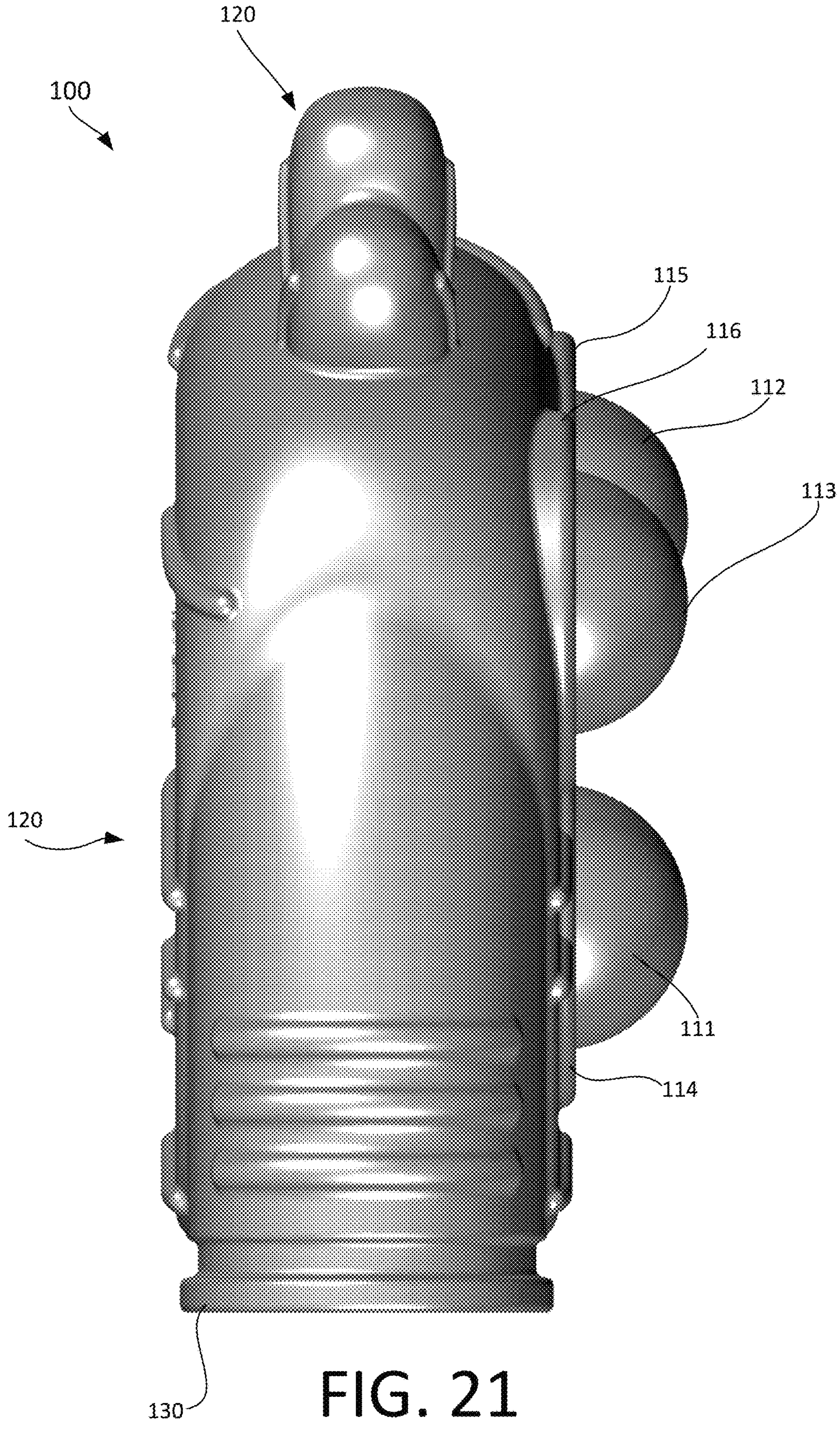
FIG. 21 is a left side view of the teething portion of FIG. 18.
Figure 22:
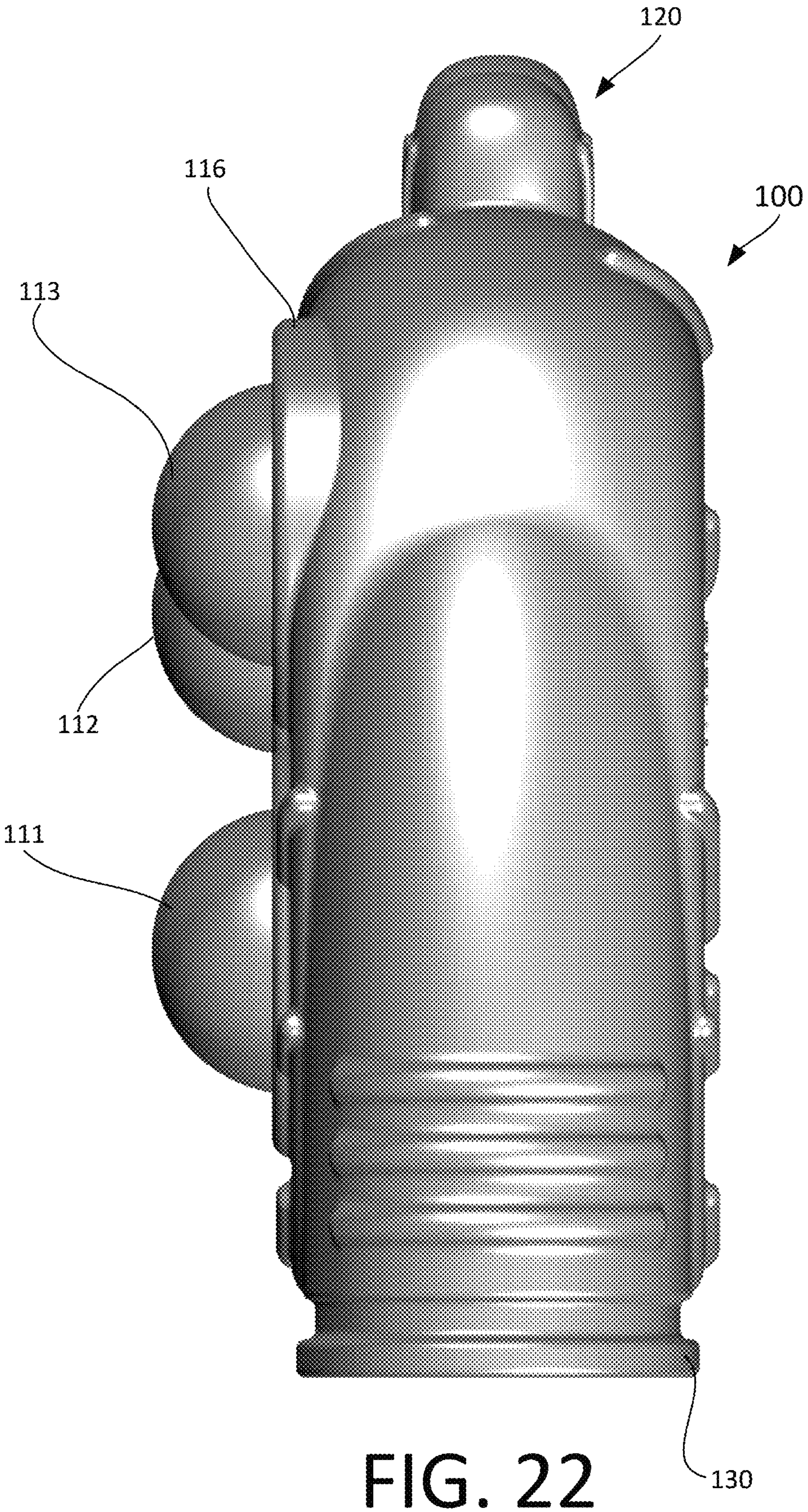
FIG. 22 is a right side view of the teething portion of FIG. 18.
Figure 23:
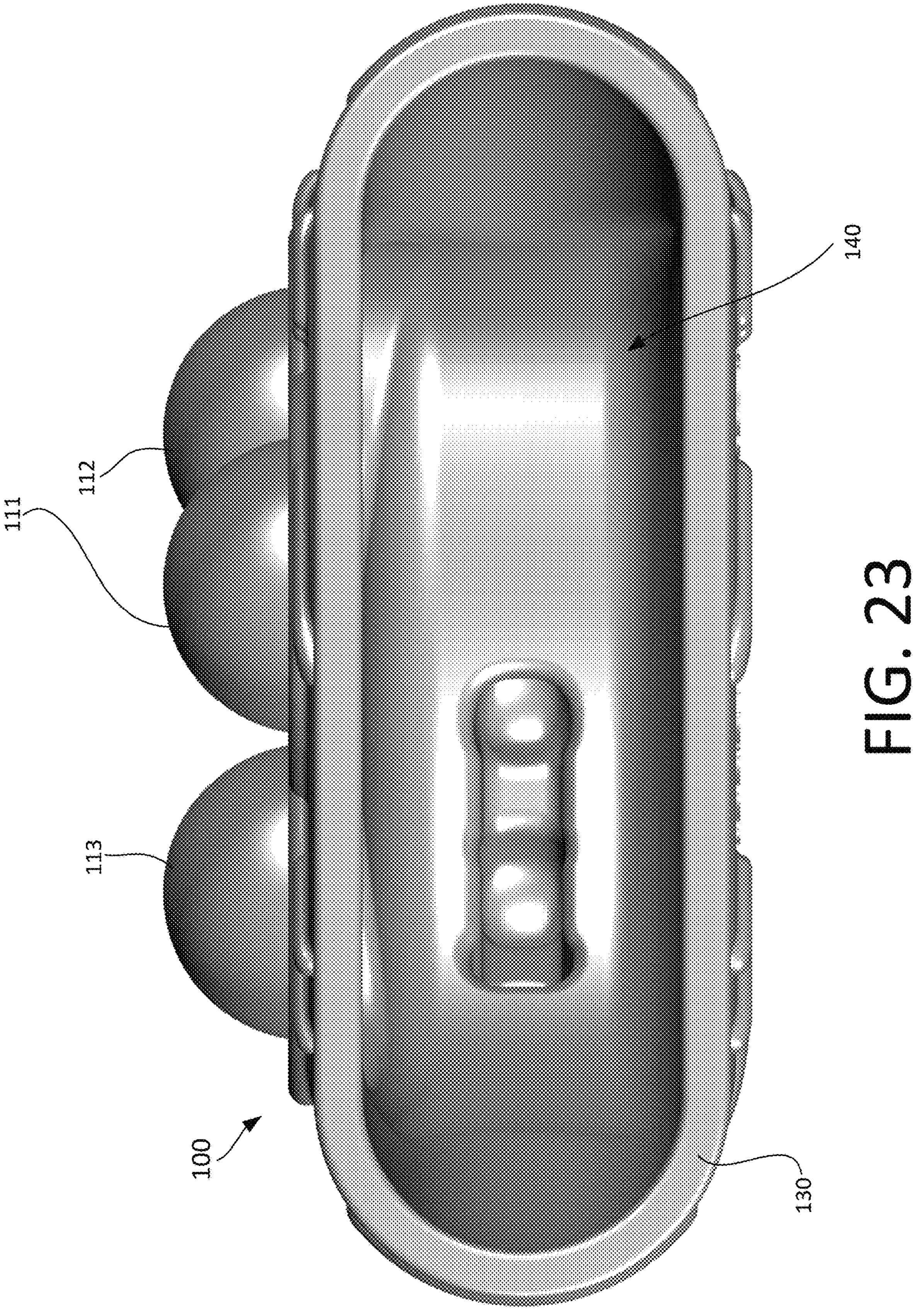
FIG. 23 is a bottom view of the teething portion of FIG. 18.
Figure 24:
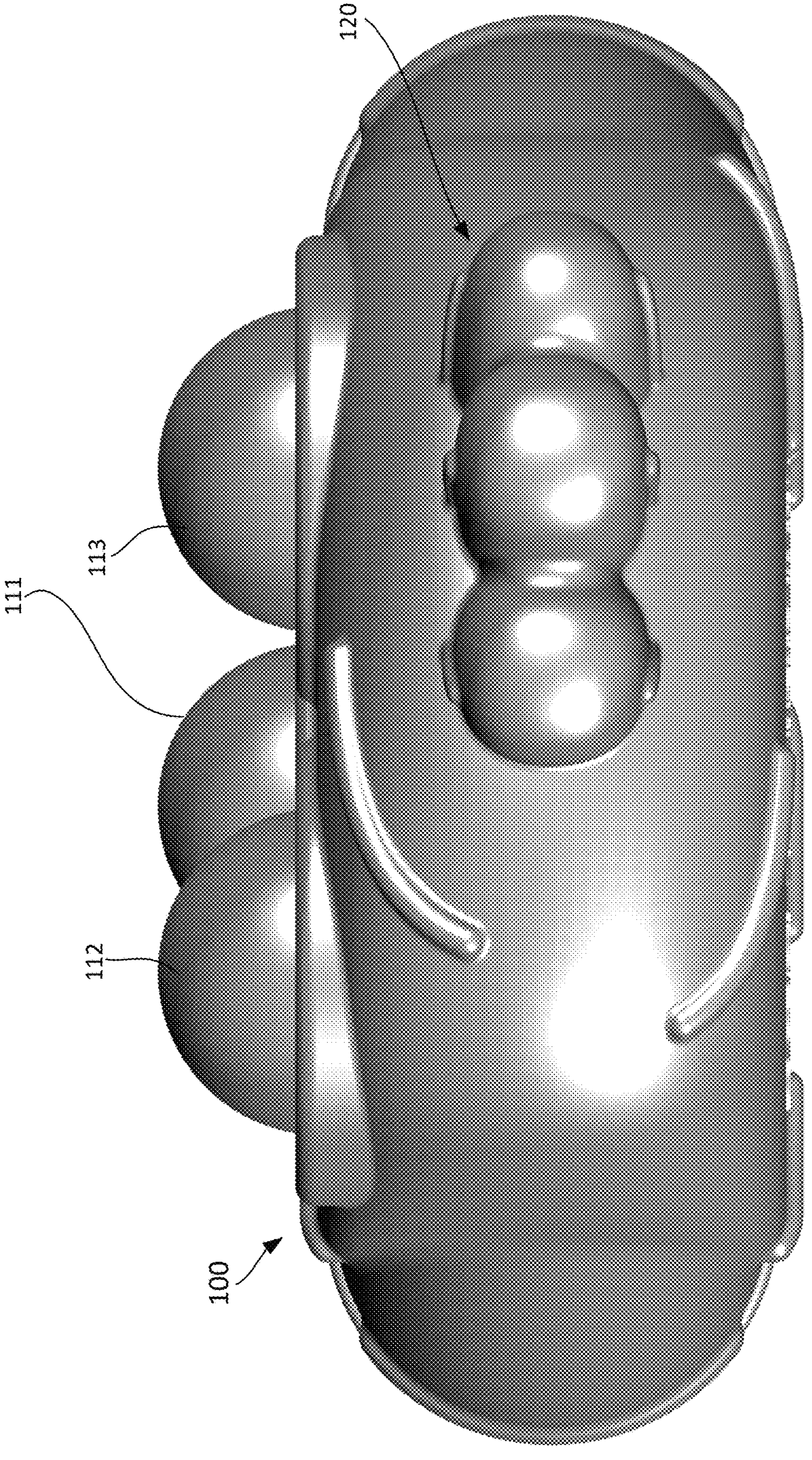
FIG. 24 is a top view of the teething portion of FIG. 18.
Figure 25:
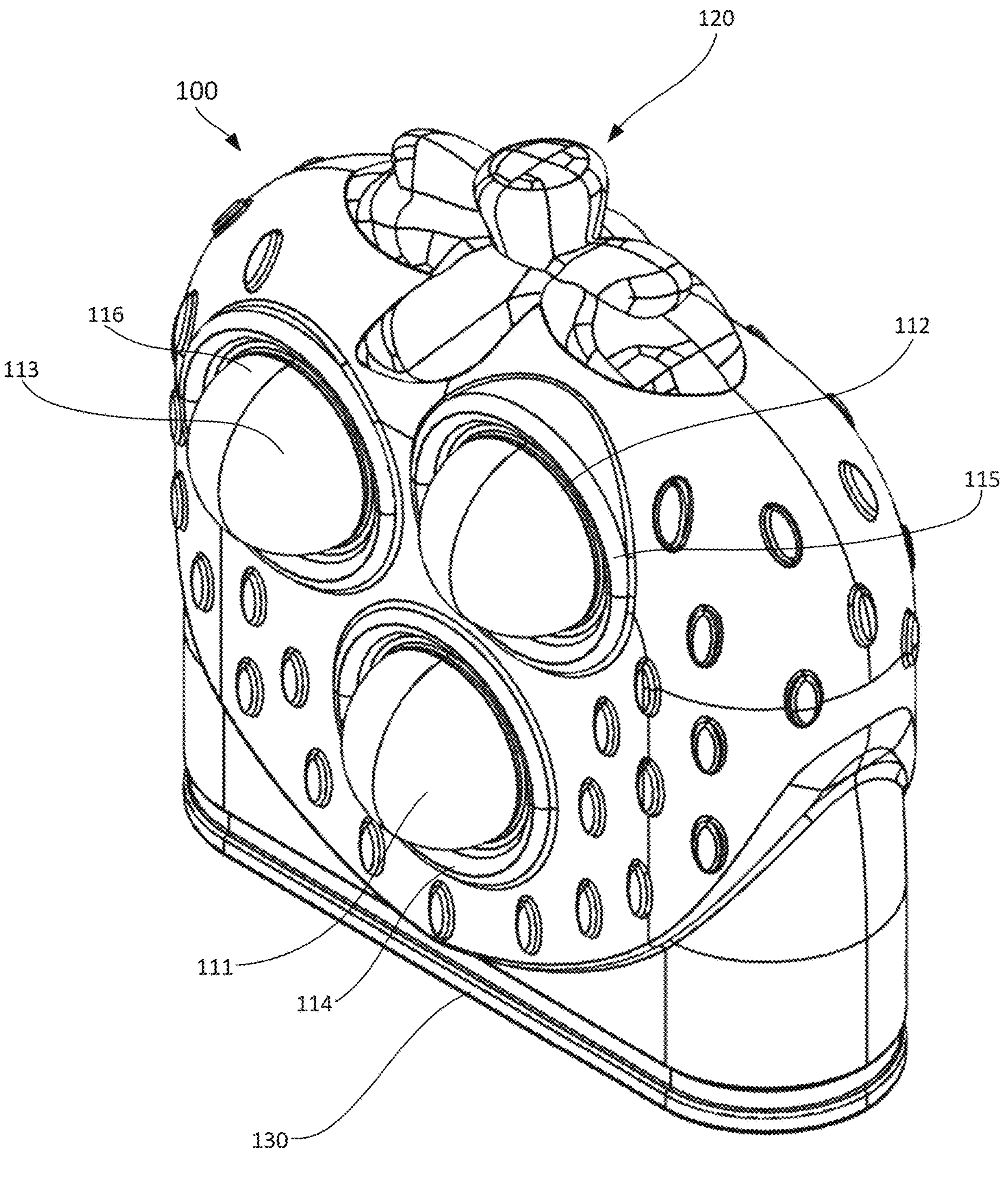
FIG. 25 is a perspective view of a teething portion of the teething mitt of FIG. 1.
Figure 26:
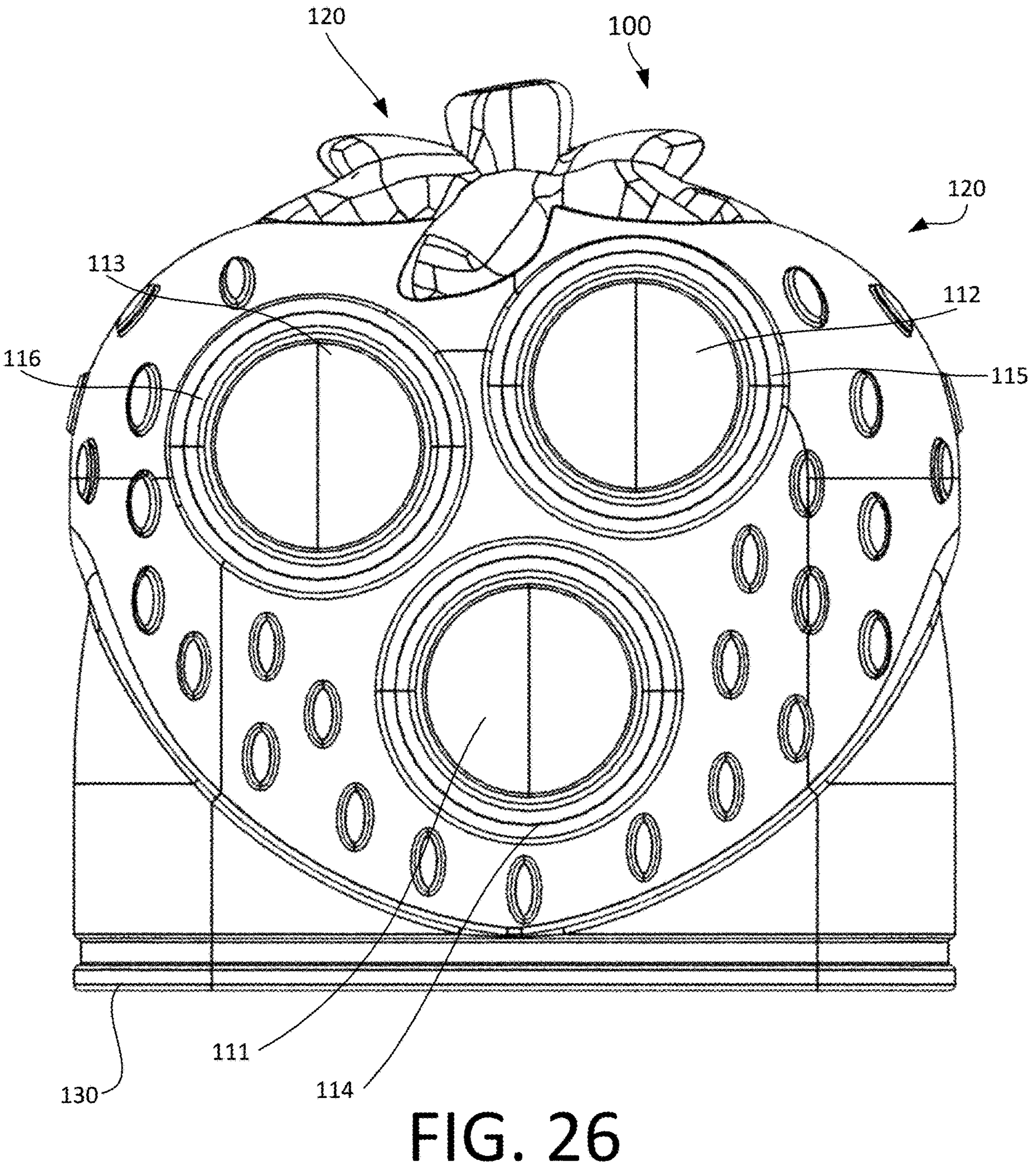
FIG. 26 is a front view of the teething portion of FIG. 25.
Figure 27:
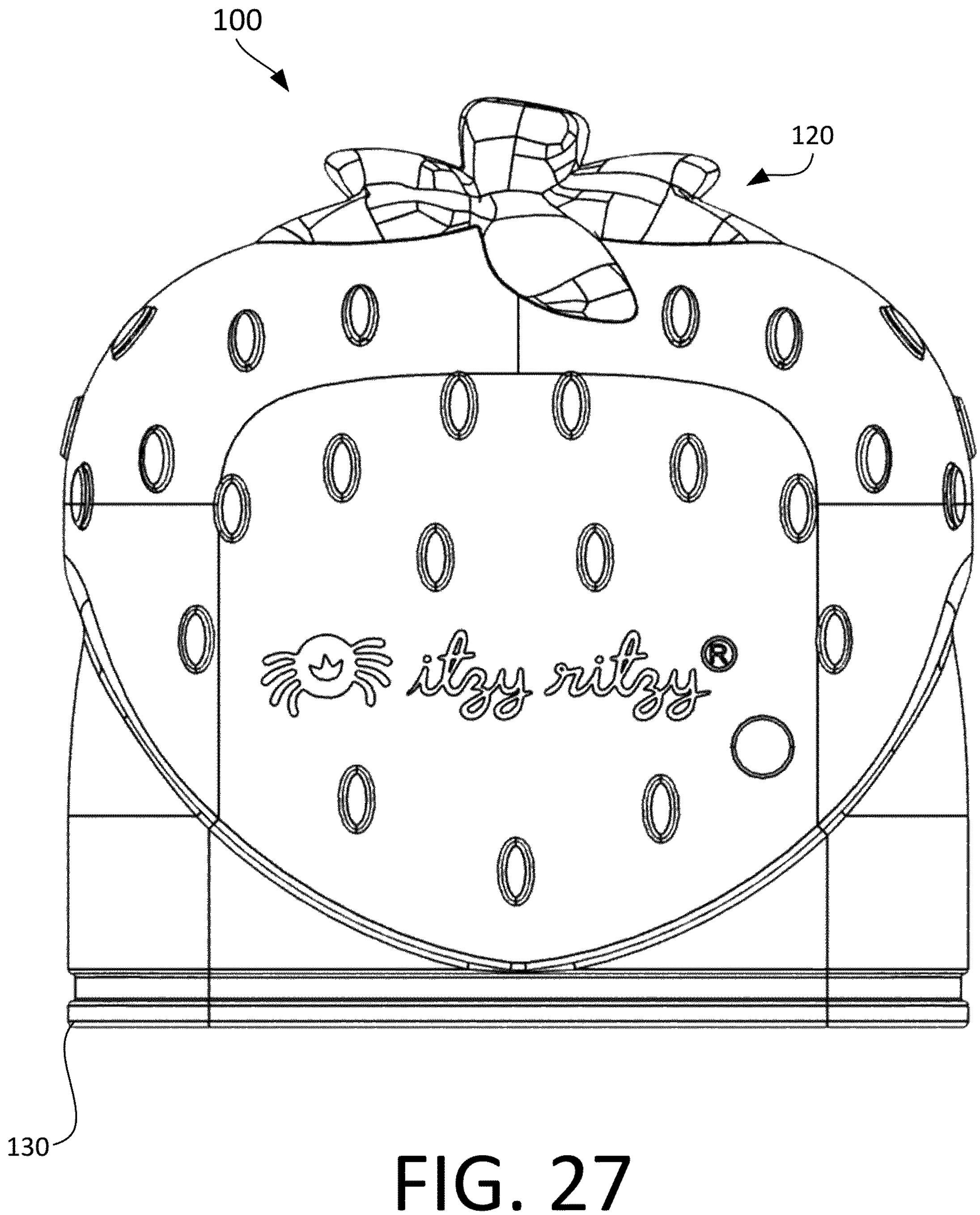
FIG. 27 is a rear view of the teething portion of FIG. 25.
Figure 28:
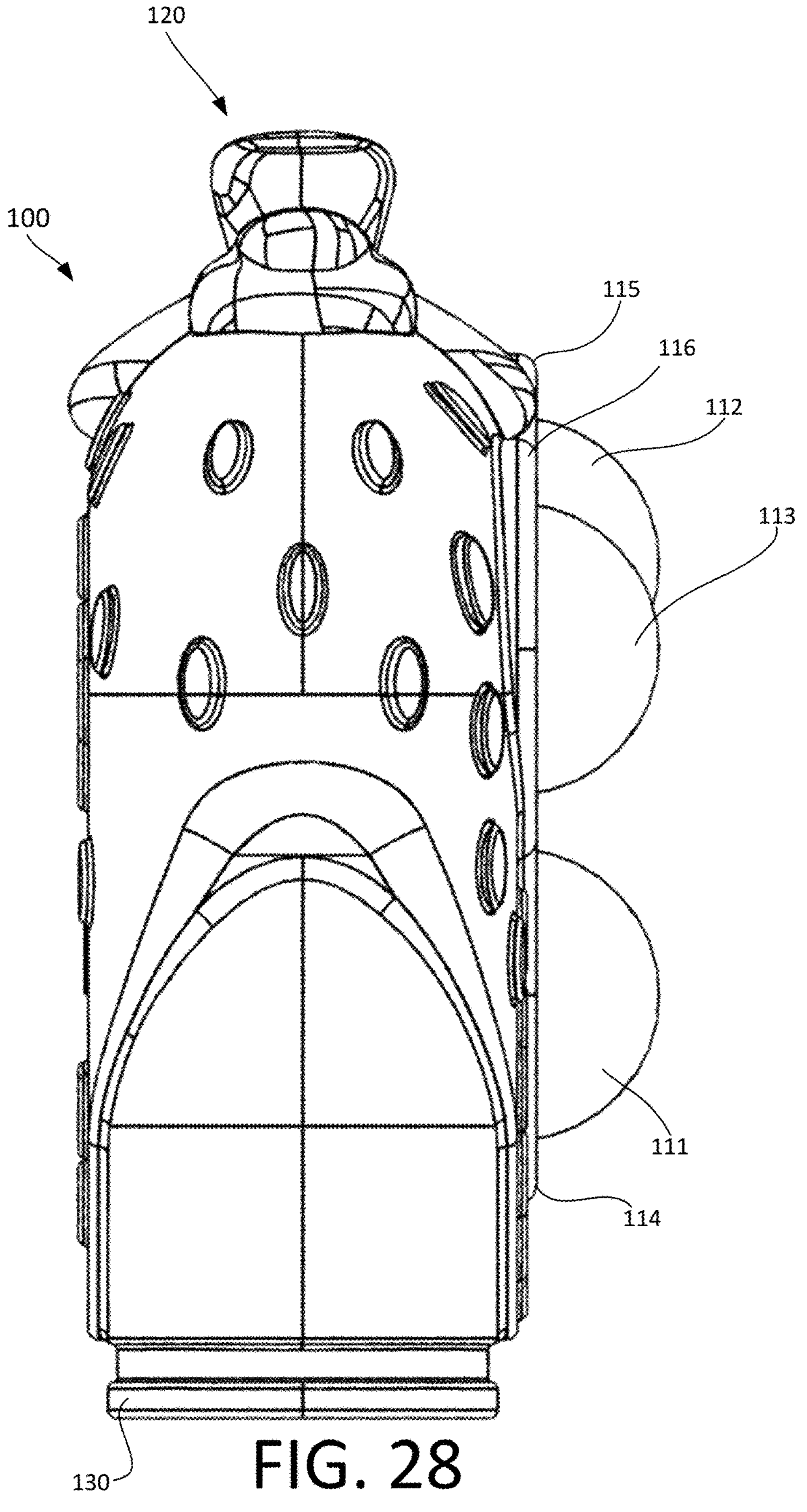
FIG. 28 is a left side view of the teething portion of FIG. 25.
Figure 29:
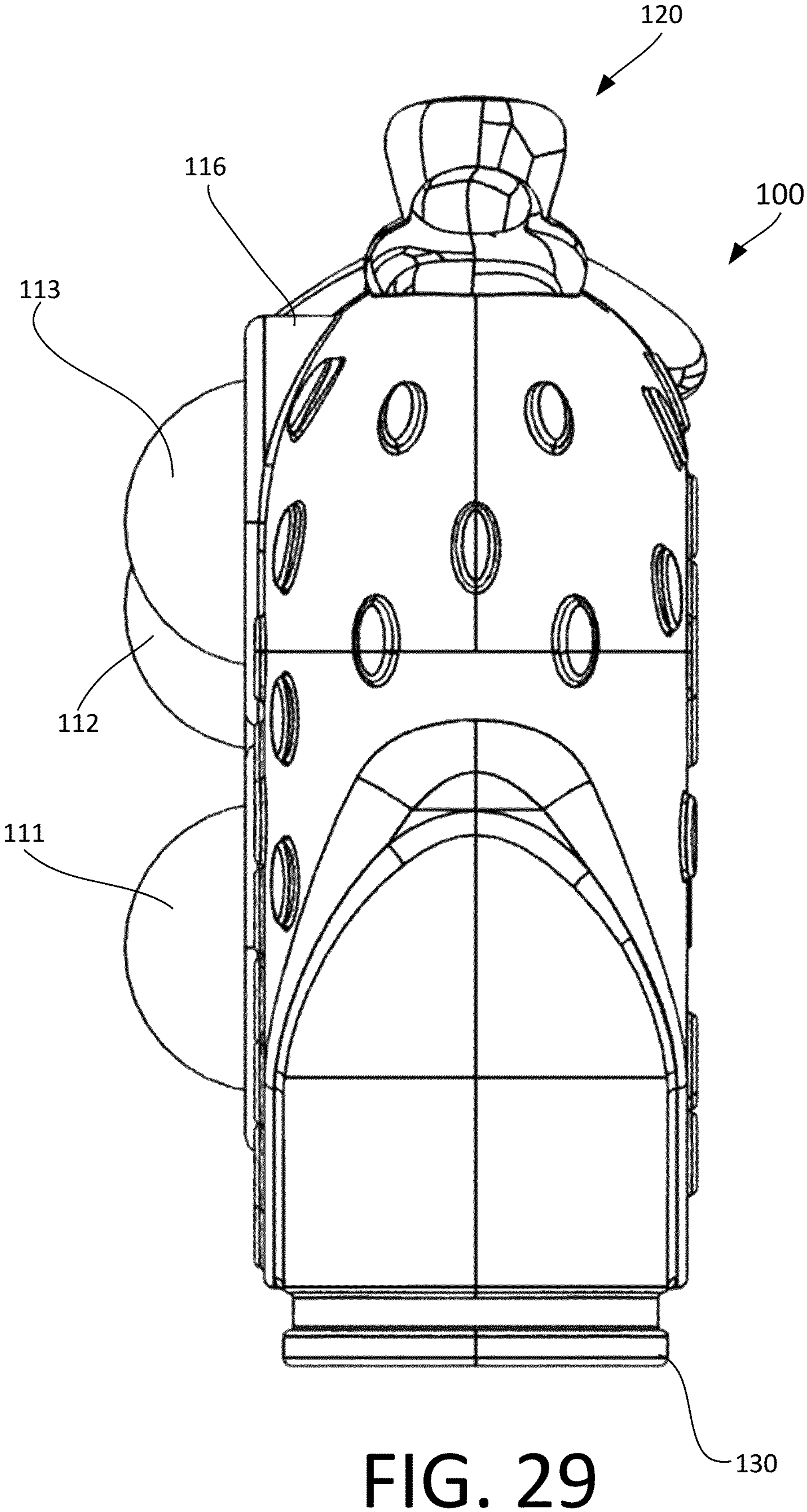
FIG. 29 is a right side view of the teething portion of FIG. 25.
Figure 30:
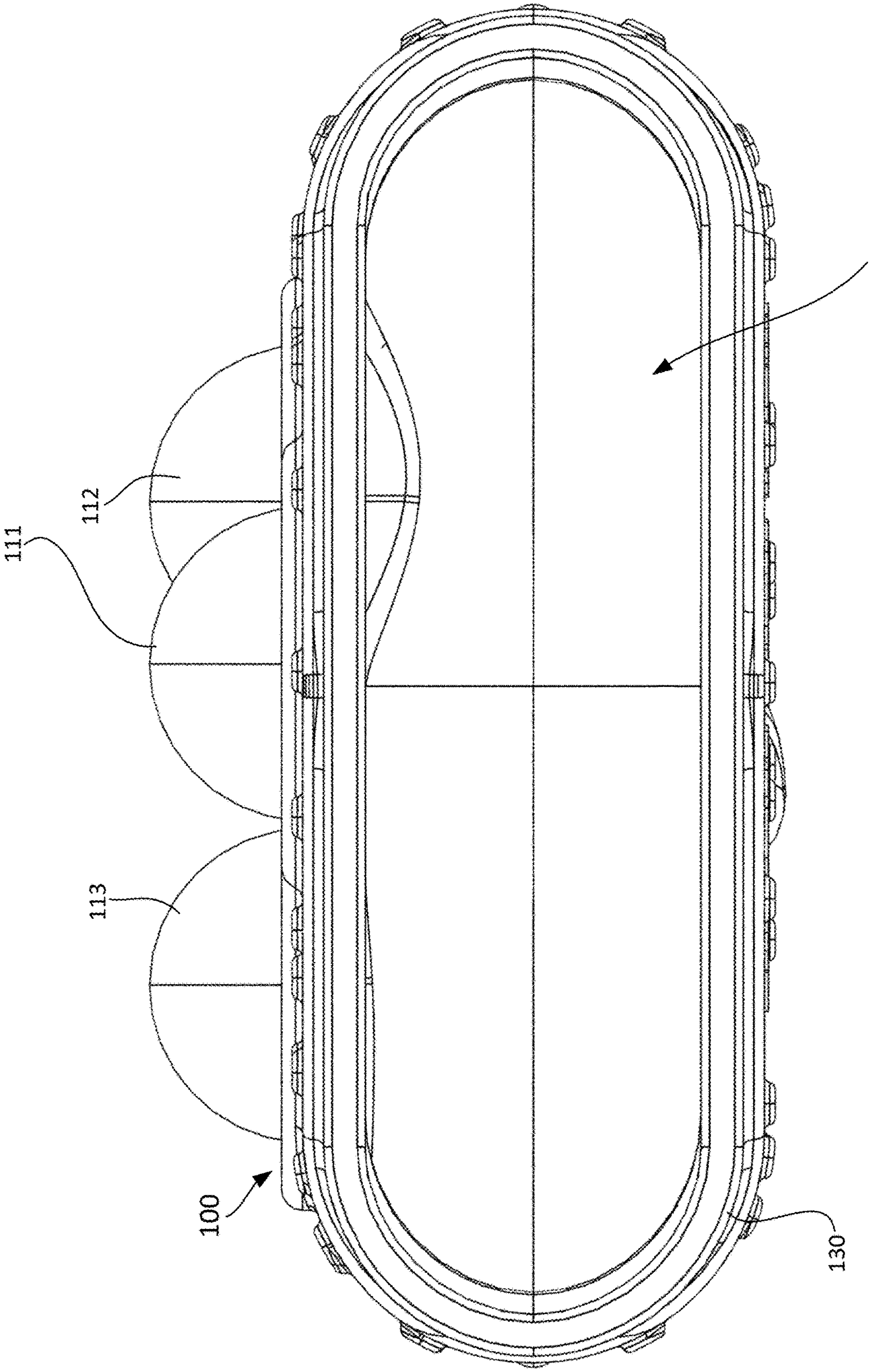
FIG. 30 is a bottom view of the teething portion of FIG. 25.
Figure 31:
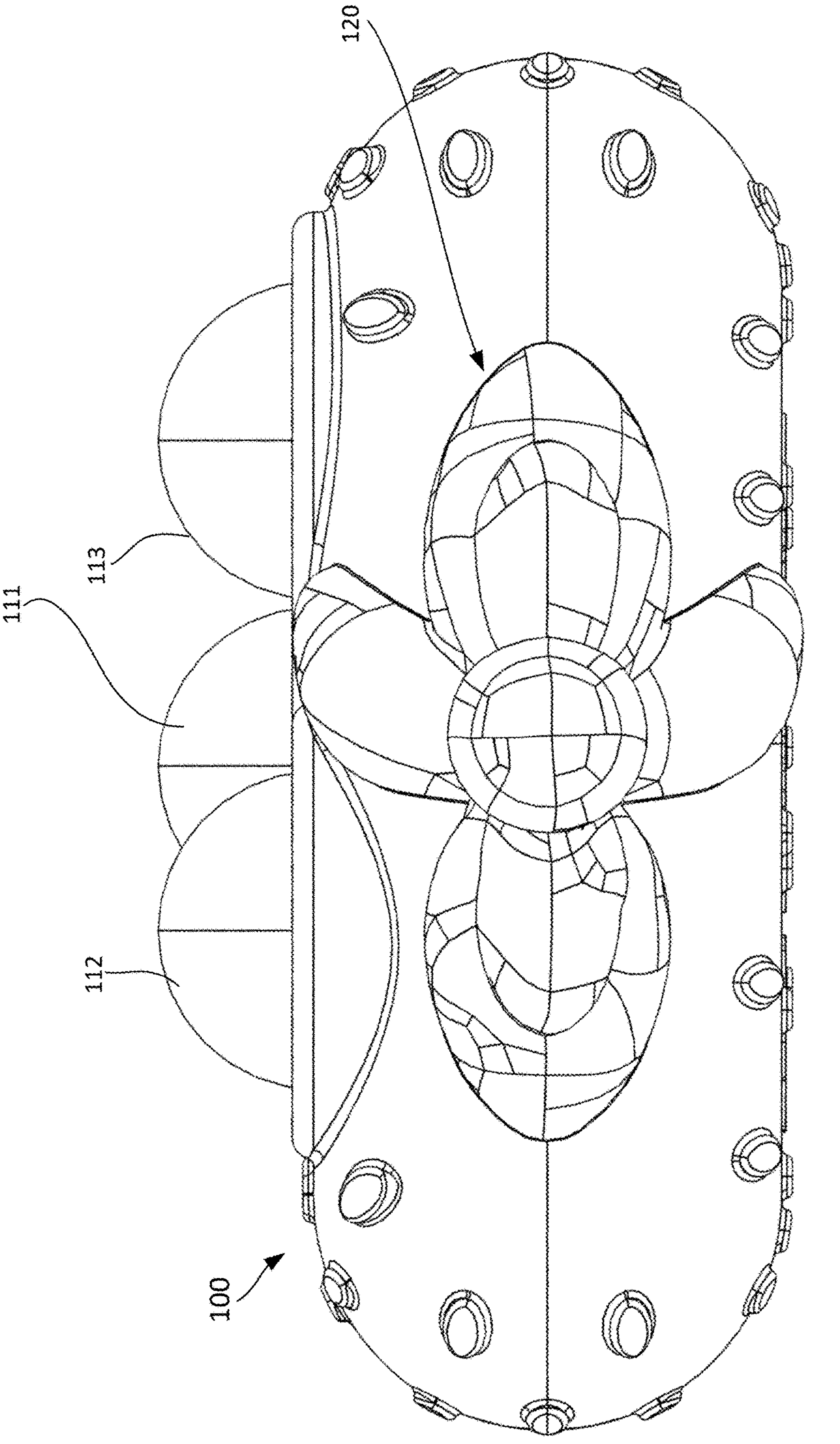
FIG. 31 is a top view of the teething portion of FIG. 25.

In addition to raised elements 111-113, the teething portion 100 may include a variety of other interactive elements 120. As shown in FIG. 3, these interactive elements 120 may be crosses and chevrons, but other interactive elements 120 are contemplated, such as the leaves of FIGS. 11 and 18 and the stem and seeds of FIG. 25. These interactive elements may provide additional stimulation for a user, and may be used to create different visual effects for the teething portion 100. For example, and as shown, the teething portion 100 may look like a cactus (as shown in FIGS. 11-17), a carrot (as shown in FIGS. 18-24), and as a strawberry (as shown in FIGS. 25-31). Although the overall shape of the teething portion 100 may be different, the functionality of the raised elements 111-113 and other components is identical.

The teething portion 100 may be secured to the glove portion 150 by any suitable means at a transition area 130. For example, the teething portion 100 may be secured to the glove portion 150 by stitching or an adhesive. In the present example, the glove portion 150 includes an adjustable strap 152 affixed to the exterior of an end of the glove portion 150 opposite to the teething portion. The adjustable strap 152 secures the glove portion 150 of the teething mitt 10 to a user by reducing a functional circumference of the glove portion 150. As such, the circumference of the glove portion 150 may initially be large enough to receive a hand, with the adjustable strap 152 able to shrink the circumference to be too small for the hand to withdraw from the glove portion 150. In some examples, the user is an infant or small child. As such, the adjustable strap 152 is configured to secure the glove portion 150 to the wrist of a small child or infant.

In some examples, the adjustable strap 152 is fixed to the glove portion 150 at a first end with stitching or another similar means, and includes at least one of Velcro, snaps, buttons, or any similar selectively-couplable mechanism at the other end (e.g., a second end). This selectively-couplable mechanism is configured to interface with (e.g., couple to) a corresponding mechanism on the glove portion 150. For example, the adjustable strap 152 may include hooks and the glove portion 150 may include loops configured to interface with the hooks in a hook-and-loop system. Accordingly, the strap 152 may have one end with a fixed position and another end that is removably couplable to the glove portion 150 in order to tighten the glove portion 150 about a user's wrist.

The glove portion 150 may be made of fabric or another similar soft-goods material. In some examples, the glove portion 150 includes a hole configured to receive a user's thumb, with the user's other fingers extending into the teething portion 100. In some examples, the fabric of the glove portion 150 may be a material (e.g., plastic) that generates sound or noise in response to movement, in contrast to a fully-soft or pliable fabric. For example, the fabric of the glove portion 150 may crinkle, pop, or otherwise respond to movement by the user. This sound-generating characteristic may be inherent to the fabric, or the characteristic may be added to otherwise sound-less fabric by incorporating a lining layer (e.g., a thin layer of plastic) onto one or both of the interior and exterior of the glove portion 150.

Although certain example apparatuses have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. A teething mitt, comprising:
- a teething portion comprising a first raised element, a second raised element, and a third raised element, each of the first, second, and third raised elements being independently toggleable between a first position and a second position, wherein:
- the teething portion comprises a resilient material configured to withstand teething forces,
- each of the first, second, and third raised elements is configured to transition from the first position to the second position in response to pressure external from the teething portion, and
- each of the first, second, and third raised elements is configured to transition from the second position to the first position in response to pressure internal to the teething portion.

2. The teething mitt of claim 1, further comprising:
- a glove portion, comprising:
  - a first end configured to couple with the teething portion; and
  - a second end configured to receive a hand of a user, the second portion having an adjustable strap affixed to an exterior of the second end and configured to secure the glove portion to the user.

3. The teething mitt of claim 2, wherein the glove portion comprises a hole configured to receive a thumb of the user.

4. The teething mitt of claim 2, wherein the glove portion comprises a plastic material configured to generate noise in response to movement of the user.

5. The teething mitt of claim 2, wherein: the adjustable strap comprises a first strap end and a second strap end, the first strap end is affixed to the exterior of the second end of the glove portion, and the second strap end comprises a coupling mechanism configured to removably couple with a corresponding coupling mechanism positioned on the exterior of the second end of the glove portion.

6. The teething mitt of claim 5, wherein the second end of the glove portion has a first circumference when the second strap end is decoupled from the second end of the glove portion, and has a second circumference when the second strap end is coupled to the second end of the glove portion, the second circumference being smaller than the first circumference.

7. The teething mitt of claim 1, wherein the teething portion comprises silicone.

8. The teething mitt of claim 1, wherein the teething portion includes at least one interactive element configured to provide oral stimulation.

9. A teething mitt, comprising:
- a teething portion comprising a plurality of raised elements, each of the plurality of raised elements being independently toggleable between a first position and a second position, wherein:
- the teething portion comprises a resilient material configured to withstand teething forces,
- each of the plurality of raised elements is configured to transition from the first position to the second position in response to pressure external from the teething portion, and
- each of the plurality of raised elements is configured to transition from the second position to the first position in response to pressure internal to the teething portion.

10. The teething mitt of claim 9, further comprising: a glove portion, comprising:
- a first end configured to couple with the teething portion; and
- a second end configured to receive a hand of a user, the second portion having an adjustable strap affixed to an exterior of the second end and configured to secure the glove portion to the user.

11. The teething mitt of claim 10, wherein the glove portion comprises a hole configured to receive a thumb of the user.

12. The teething mitt of claim 10, wherein the glove portion comprises a plastic material configured to generate noise in response to movement of the user.

13. The teething mitt of claim 10, wherein: the adjustable strap comprises a first strap end and a second strap end, the first strap end is affixed to the exterior of the second end of the glove portion, and the second strap end comprises a coupling mechanism configured to removably couple with a corresponding coupling mechanism positioned on the exterior of the second end of the glove portion.

14. The teething mitt of claim 13, wherein the second end of the glove portion has a first circumference when the second strap end is decoupled from the second end of the glove portion, and has a second circumference when the second strap end is coupled to the second end of the glove portion, the second circumference being smaller than the first circumference.

15. The teething mitt of claim 9, wherein the teething portion comprises silicone.

16. The teething mitt of claim 9, wherein the teething portion includes at least one interactive element configured to provide oral stimulation.

* * * * *